US 8,862,261 B1

(12) United States Patent
Roise

(10) Patent No.: US 8,862,261 B1
(45) Date of Patent: Oct. 14, 2014

(54) METHOD AND SYSTEM FOR CUTTING-STOCK OPTIMIZATION ACROSS SCHEDULES AND BATCHES

(76) Inventor: Geoffrey J. Roise, Mankato, MN (US)

( * ) Notice: Subject to any disclaimer, the term of this patent is extended or adjusted under 35 U.S.C. 154(b) by 631 days.

(21) Appl. No.: 13/220,649

(22) Filed: Aug. 29, 2011

Related U.S. Application Data

(62) Division of application No. 11/750,978, filed on May 18, 2007, now Pat. No. 8,010,216.

(60) Provisional application No. 60/801,885, filed on May 18, 2006, provisional application No. 60/890,470, filed on Feb. 16, 2007.

(51) Int. Cl.
*G06F 19/00* (2011.01)

(52) U.S. Cl.
USPC .......................................... 700/171; 700/100

(58) Field of Classification Search
USPC .................................................. 700/100, 171
See application file for complete search history.

(56) References Cited

U.S. PATENT DOCUMENTS

| | | | |
|---|---|---|---|
| 4,221,974 A | 9/1980 | Mueller et al. | |
| 5,808,891 A * | 9/1998 | Lee et al. ...................... | 700/108 |
| 6,205,370 B1 * | 3/2001 | Blaimschein et al. ........ | 700/134 |
| 6,606,527 B2 | 8/2003 | de Andrade et al. | |
| 6,690,990 B1 | 2/2004 | Caron et al. | |
| 6,898,478 B2 | 5/2005 | Dick et al. | |
| 6,941,864 B2 * | 9/2005 | Dick et al. ..................... | 101/483 |
| 7,024,265 B2 * | 4/2006 | Walser et al. ................. | 700/100 |
| 7,031,789 B1 | 4/2006 | Dick et al. | |
| 7,206,656 B2 | 4/2007 | Clayton et al. | |
| 7,277,768 B2 | 10/2007 | Dash et al. | |
| 7,647,133 B2 * | 1/2010 | Gee et al. ...................... | 700/171 |
| 8,290,607 B2 * | 10/2012 | Couronne et al. ............ | 700/100 |
| 2003/0078689 A1 * | 4/2003 | Buervenich et al. .......... | 700/100 |
| 2003/0109950 A1 * | 6/2003 | Andrade et al. .............. | 700/103 |
| 2004/0117058 A1 * | 6/2004 | Dick et al. ..................... | 700/171 |
| 2004/0225394 A1 * | 11/2004 | Fromherz et al. ............. | 700/101 |
| 2006/0100727 A1 * | 5/2006 | Dash et al. ...................... | 700/97 |
| 2007/0112451 A1 * | 5/2007 | Clayton et al. ................ | 700/100 |

OTHER PUBLICATIONS

Alvarez-Valdes, R., et al., "Technical Report: A GRASP algorithm for constrained two-dimensional non-guillotine cutting problems", "web address: http://www.uv.es/sestio/TechRep/tr01-04.pdf", 2004.

(Continued)

*Primary Examiner* — Michael D Masinick
(74) *Attorney, Agent, or Firm* — Charles A. Lemaire; Lemaire Patent Law Firm, P.L.L.C.

(57) ABSTRACT

A method and system for optimizing cutting of various materials. In some embodiments, an algorithm optimizes cutting by grouping items to be cut, wherein a plurality of cutting-stock pieces are grouped together and aligned such that a single cut simultaneously cuts items from all of the pieces. Some embodiments optimize a combination of reduced labor cost, reduced materials cost (e.g., reducing scrap), and/or reduced time needed to obtain an inventory of pieces cut to specified lengths and shapes (checking the various permutations). Overall optimization of labor and material is achieved by a combination of fewer cuts and reduced waste. Some embodiments include a computer-readable medium having instructions executed by a computer that optimizes placement of cuts to obtain cut-part items, and optionally controls a saw, laser, water-jet cutter or the like. In some embodiments, a human operator making the cuts is instructed by the computer to achieve the optimization.

19 Claims, 13 Drawing Sheets

(56) References Cited

OTHER PUBLICATIONS

Fekete, Sandor P., et al., "A Combinatorial Characterization of Higher-Dimensional Orthogonal Packing", "web address: http://arxiv.org/PS_cache/cs/pdf/0310/0310032v1.pdf", Oct. 16, 2003.

Nicklas, Lisa D., et al., "A Parallel Solution to the Cutting Stock Problem for a Cluster of Workstations", "Proceedings of the High Performance Distributed Computing", 1996.

Tschoke, Stefan, et al., "A New Parallel Approach to the Constrained Two-Dimensional Cutting Stock Problem", "Workshop on Parallel Algorithms for Irregularly Structured Problems", 1995.

Viswanathan, K.V., et al., "Best-first search methods for constrained two-dimensional cutting stock problems", "Operations Research", Jul.-Aug. 1993, pp. 768-776, vol. 41, No. 4.

Wang, P.Y., "Two Algorithms for Constrained Two-Dimensional Cutting Stock Probiems", "Operations Research", May-Jun. 1983, pp. 573-586, vol. 31, No. 3.

\* cited by examiner

METHOD AND SYSTEM FOR CUTTING-STOCK OPTIMIZATION ACROSS SCHEDULES AND BATCHES

CROSS REFERENCE TO RELATED APPLICATIONS

The present application is a divisional of U.S. patent application Ser. No. 11/750,978, filed May 18, 2007 (which issued as U.S. Pat. No. 8,010,216 on Aug. 30, 2011), titled "SYSTEM AND METHOD FOR CUTTING-STOCK OPTIMIZATION ACROSS SCHEDULES AND BATCHES," which claims benefit to U.S. Provisional Patent Application No. 60/801,885, filed May 18, 2006 and titled "SYSTEM AND METHOD FOR CUTTING-STOCK OPTIMIZATION," and to U.S. Provisional Patent Application No. 60/890,470, filed Feb. 16, 2007 and titled "SYSTEM AND METHOD FOR CUTTING-STOCK OPTIMIZATION ACROSS SCHEDULES AND BATCHES," each of which is incorporated herein by reference in its entirety including appendices.

COPYRIGHT NOTICE

This patent document contains copyrightable computer software elements including but not limited to source code, flow charts and screen displays. The following notice shall apply to these elements: Copyright© 2006-2007 Geoffrey J. Roise. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of manufacturing systems and methods, and more particularly to software and systems employing software to optimize the cutting of various stock materials including, for example, the one- and two-dimensional cutting of woods, plastics, metals and related materials, wherein optimization is performed of parts to be cut relative to stock material from which the parts are cut.

Source-Code Appendices

An Appendix containing source-code files that make up one embodiment of the present invention are attached at the end of this application. These source-code files in Appendix A are incorporated by reference in their entirety into this application.

BACKGROUND OF THE INVENTION

Cutting-stock-optimization algorithms are known in the art. Some of the better-known algorithms are those by P. Y. Wang addressing constrained one- and two-dimensional cutting-stock problems. While these algorithms tend to describe certain steps to optimize based upon certain combinatoric solutions, these solution are based primarily upon spatial considerations relating to the most optimal way to use the starting materials (e.g., a stock sheet). What is needed is an implementation of a cutting-stock algorithm that optimizes based upon not only spatial considerations and efficiencies, but also based upon scheduling, batching and labor considerations and efficiencies.

SUMMARY OF THE INVENTION

The present invention provides a method and system of optimizing the cutting of various materials, wherein optimizations include those within a batch as well as those that spill across batches and even schedules of different work shifts and different days' work. In such an environment, there is a cost incurred in cutting too much stock before it is going to be assembled into a product (due to work-in-progress storage space and tracking costs), as well as a cost in the labor of operating the cutting machine, and a cost of wasted material in scraps that are too short to use in a product.

In some embodiments, the present invention provides an optimized cutting-stock algorithm is implemented that optimizes based upon one or more variables including the grouping or combining of various stocks, that is, materials to be cut. In some embodiments, a cutting-stock algorithm of the present invention optimizes based upon certain permutations (e.g., the variables of labor cost and/or materials cost viewed in light of scheduling and batching considerations). Optimization in either variable (i.e., labor or materials), or the combination of the two, is in terms of lowering the number of cuts that must be made, and/or the amount of wasted materials. In short, optimization can be via labor saving or material saving across cutting schedules and/or batches of materials to be cut. In some embodiments, these algorithms are implemented in a computer-readable medium that is executed by a suitably programmed computer, which, in turn, controls a saw, laser, water-jet cutter or some other cutting device. In some embodiments, a human operator is instructed by the suitably programmed computer as to when to make a cut.

In some embodiments, the present invention essentially provides optimization using groups of batches to provide optimizations across bigger batches (since when optimizing the planned cutting using a larger number of pieces, there is a better opportunity to reduce scrap and labor) while keeping the size of each job presented to an operator reasonably small. In some embodiments, this is accomplished by doing multiple levels of look-ahead to one or more future batches (i.e., the primary batch that will be cut next plus one or more subsequent batches) that possibly could be combined, at least partially, into the present (primary) batch for a better fit and optimization.

In some embodiments, a number of variables (such as the availability and timing of raw materials (how much, at what cost, and when), the incoming orders (which individually or in combination with other orders form the batch orders of cuts to be made), and the availability and cost of labor (including skill levels needed, whether overtime would be required, and like considerations), and other variables) are presented to a user of the present invention. As used herein, the term "order" means a specification for one or more parts to be cut from stock material. Stock material is the starting linear material (such as wood or plastic) from which lengths are cut to form the cut parts having specified angles of cut at each end (and optionally other machining done, such as holes drilled and the like), or starting sheet material from which panels (or the like) having specified shapes are cut or stamped. The user applies these variables defining the cut parts as specified parameters that control a computer program that examines the batch orders, and using one or more levels of look-ahead (i.e., the number of batches over which optimization is performed) (and optionally using further guidance and input from the operator), generates layout specifications and commands for the cutting machine(s) and each machine's operator(s). This look-ahead process uses revolving or rolling optimization groupings of orders, such that when planning a first batch layout (the placement of cut-part specifications onto stock (or "raw") materials to be cut), the optimization will look to possible combinations with a second, and possibly a third, or further-future batch, and possibly delay portions of the present batch or re-order future batches to be cut earlier, to optimize within given constraints of raw material availability and cost, the availability of storage space to store pieces of future batches until they can be assembled, the availability of skilled operators, and numerous other constraints. Once all the pieces for that first batch have been cut to specification, that batch is removed from the optimization process, and an additional future batch is added to those being considered in the optimization.

A user may choose the extent of optimization to balance between material yield, cost or raw materials and labor, and/or amount of work-in-progress inventory waiting for assembly and like choices. The optimizer then receives the list of batches and the list of raw material, and outputs a saw layout specification for each successive time period.

DESCRIPTION OF EMBODIMENTS

Figure 1:
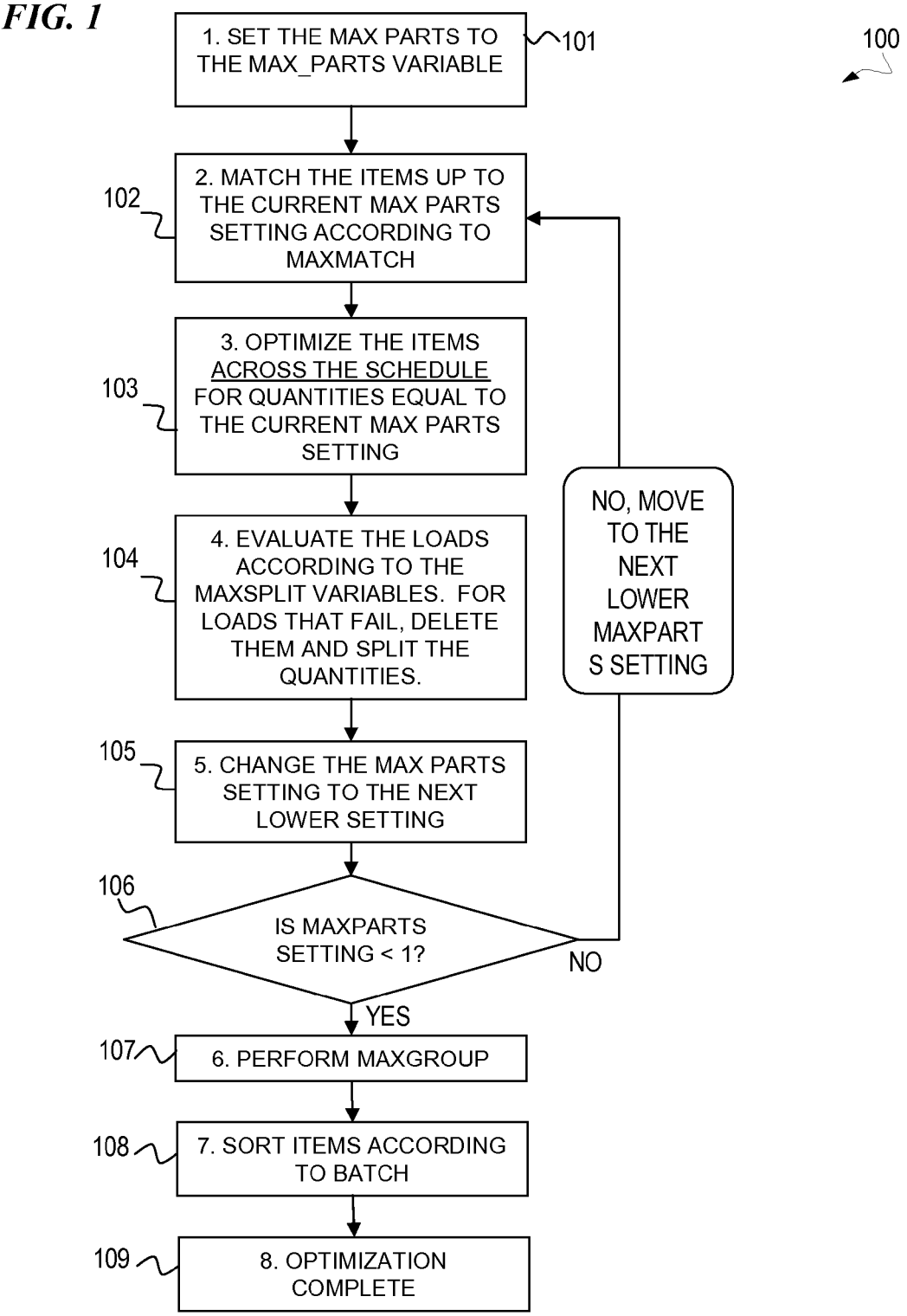
FIG. 1 is a flowchart describing an algorithm 100.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from its use in the context of the description.

An Overview of Various Batching Algorithms

There have been varieties of different approaches to the problem of optimizing the one- and two-dimensional cutting of materials such as metals, wood, vinyls, synthetic boards, paper, glass, fabric, plastic or rubber materials. U.S. Pat. No. 6,690,990 ("Caron et al."), which is incorporated by reference, discloses optimization within the context of cutting based upon certain reference axes, such as an orthogonal reference axis. Other cutting algorithms have optimized based upon certain input variables, such a minimum salvage length, or a minimum defect length, to name a few. U.S. Pat. No. 6,941,864 ("Dick et al."), which is incorporated by reference, is an example of one such algorithm. These exemplary cutting-stock solutions fail to address the combinatoric- or permutation-based solutions to cutting-stock optimization, especially those solutions that attempt to use labor or scrap costs as a basis for optimization.

In some embodiments, a cutting-stock-optimization algorithm is described that could be used in the context of either the one- or two-dimensional cutting of materials. In some embodiments, a saw, laser, or water-jet cutter or other suitable device is used to cut these materials. In some embodiments, the saw is, for example, a computer numerical control ("CNC") saw, 90 degree saw, 45 degree-45 degree saw (i.e., a miter saw), a 45 degree-90 degree saw, a table saw, rip saw, upcut saw, circular saw, cabinet saw, radial-arm saw, rotary saw, miter saw (electric or otherwise) or other suitable saw. In some embodiments, a CNC punch is used to cut these materials. In some embodiments, certain materials are grouped together or combined based upon, for example, a cut list. In some embodiments, these groupings are ordered such that certain groupings are cut prior to other groupings. In some embodiments, the manner in which certain materials are grouped and the priority in which they are cut is based upon what type of optimization is being sought.

In some embodiments, the cutting-stock-optimization algorithm is used to cut long linear materials ("cutting stock" such as shaped wood, vinyl or aluminum that are cut to form smaller pieces of a specific length, width, and ending angle(s) or miter(s)) to be used in the manufacture of parts used to make windows and doors, parts such as sashes (framing that holds panes of glass of a window), stiles (vertical side members of the window), lintels (horizontal beam at the top of a window or door), transoms (horizontal beams that divide a window), and other components that make up a door or window. In some embodiments, a single layer of parts is cut from a single piece of stock material. Items that can be built include picture frames or other items made from cut pieces of a linear starting or stock material (wherein each cut part is defined by cut(s) at one or both ends of the cut part, however additional operations such as drilling and/or tapping holes or other machining or manufacturing operations may optionally also be done), manufactured items made from sheet material, wherein the cuts may involve more than just two ends, such as cutting the entire perimeter of the cut part item (however additional machining or manufacturing operations such as folding, welding, and the like may optionally also be done) such as an electronic chassis made from stamped metal parts cut from sheet stock material (such as sheet metal unwound from a roll), or any other suitable manufacturing items that are cut or stamped from stock material. As used herein, the term "cut" means any operation such as sawing with a saw blade or water jet, cutting with a plasma torch or high-power laser, shearing, stamping, or like operations that separate and/or shape the cut parts from a stock material. As used herein, stock or raw material means any source material from which the cut parts are cut. Linear stock material means stock material having any desired cross-sectional shape that is cut according to a length specification (and optionally these cuts are also according to other specifications such as, for example, the angle of the end cut), and which parts to be cut are laid out end-to-end along a longest dimension of the linear stock material. In general, the optimization for parts cut from linear stock material is done by fitting the lengths of the various parts to the lengths of the pieces of linear stock material. Sheet stock material means stock material having any desired cross-sectional shape that is cut according to a perimeter specification of the to-be-cut parts (and optionally these cuts are also according to other specifications such as, for example, the angles or shapes of the cuts, or dead-end cuts that only extend part way across the sheet), and which parts to be cut are laid out both end-to-end along a length dimension of the sheet stock material and/or laid out side-by-side along a width dimension of the sheet stock material. If the sheet stock material is flat and uniform, the sheet cut parts may be rotated during the fitting in order to fit more parts on a sheet of stock material and thus get greater yield. Some of these window-, and window-and-sash combinations include, for example, double-hung sash windows, single-hung sash windows, horizontal sliding sash windows, casement windows, tilt-and-slide windows, tilt-and-turn windows, jalousie windows, clerestory windows, skylights, bay windows, oriel windows, fixed windows, divided-light windows, or other combinations and window types.

In some embodiments, other materials or shapes can be cut to form smaller pieces of a specific length, width, and ending angle(s) or miter(s). For example, one or more steel pipes can be grouped such that the cuts, used to obtain pieces of predetermined lengths for particular uses, are optimized. Similarly, a predetermined amount of aluminum (e.g., trim or other suitable pieces) can be optimized and cut to a predetermined length. Further, in some embodiments, one or more sashes can be optimized and cut to a predetermined length. In yet still other embodiment, one or more pieces of wood used to make up the height or width portion of a window frame can be optimized and cut.

In some embodiments, optimization is based upon minimizing the labor costs associated with cutting, whereas, in other embodiments, optimization is based upon minimizing the amount of waste materials produced as a byproduct of cutting. In some embodiments, optimization is based upon a comparison, or weighing of these two factors to determine which, relatively speaking, has the greater cost in terms of, for example, money. In some embodiments, labor costs can be lessened through reducing the number of cuts that an operator of a cutting device (e.g., a saw) must make. In some embodiments, waste materials can be reduced by, for example, keeping an inventory of available materials to be cut such that new cutting-stock materials need not be used. Materials taken from this inventory of materials can then be combined or grouped with other materials, and cut with a single cut, thus minimizing labor and materials costs.

In some embodiments, this combining or grouping takes the form of combining or grouping materials scheduled to be cut at different times, or materials form separate batches of similar materials. In some embodiments, by selecting materials from a larger universe of materials than would otherwise be used, efficiencies can be increased in the form of few cuts required, and thus less labor costs. In short, in such an embodiment, economies of scale are used to generate greater efficiencies in the cutting of materials.

In some embodiments, an object oriented or structured programming language such as C++, Java™, Fox Pro™, C, .NET, or Delphi™ (or the like) is used to implement an algorithm to optimize cutting across a schedule or a batch. In some embodiments, an algorithm is implemented that optimizes by considering the entire cutting schedule for a predetermined time period, and looking for the same or similar size cuts within this schedule. Additionally, in some embodiments, an algorithm is implemented that seeks to optimize across a predetermined number of batches, whereby the same or similar cut sizes are looked for across these predetermined number of batches. Moreover, in some embodiments, an algorithm is implemented that seeks to optimize by looking for the same or similar size cuts within a batch. The actual implementation details of these algorithms will be contingent upon the needs or desires of the particular developer implementing these algorithms. For example, in some embodiments, these algorithms will be implemented together using case statements (see below) or branch statements. In some embodiments, these algorithms will implement iterative loops or recursive functions to repeat certain steps in a particular algorithm.

Maxcuts Optimizer

In some embodiments, the present invention provides an apparatus and method (sometimes called the MAXCUTS OPTIMIZER) for continuous-flow optimization using a computer-implemented program called maxcuts. A main setting is "MaxLook" which tells the optimizer how to look at the data and how to treat it using various settings. In each scenario, it is assumed that there are pieces of material in various "batches" that need to be cut in a day, week, etc. Batch A would be items that are needed first, Batch B second, C third, etc. Table 1 is an example of items that are in different batches (often with other items and quantities).

TABLE 1

| Batch A | | Batch B | | Batch C | | Batch D | |
|---|---|---|---|---|---|---|---|
| Qty | Size | Qty | Size | Qty | Size | Qty | Size |
| 2 | 15.88 | 2 | 15.88 | 1 | 15.88 | 1 | 15.88 |
| 2 | 21.24 | 1 | 21.24 | 4 | 21.24 | 1 | 21.24 |
| 1 | 28.00 | 2 | 48.88 | 1 | 27.88 | 1 | 18.88 |
| 2 | 35.55 | 1 | 40.00 | 1 | 42.00 | 1 | 27.00 |
| 2 | 39.00 | 2 | 27.00 | 2 | 48.00 | 2 | 39.00 |
| . . . and so on | | . . . and so on | | . . . and so on | | . . . and so on | |

When the operator is cutting "Batch A", "Batch A" is the primary batch. When the operator is cutting Batch C, Batch C becomes the primary batch. This is an example of one part but oftentimes there are many parts in each batch. Each can have its own rules and properties. Regardless of the setting for maxlook, it is important to define the following terms in Table 2:

TABLE 2

| Term | Description |
|---|---|
| Primary Batch | The batch the saw operator is cutting at the current time. |
| Optional Batches | Batches that can be cut with the primary batch if certain rules fail for the primary batch. |
| Load | Every time an operator places raw material on the saw for cutting counts as a load. A load can contain 1 piece of raw material, 2 pieces, 3 pieces, 4 pieces, etc. |
| Cycle | Every time the saw cuts. If the saw is cutting 8 pieces at a time, it counts as one cycle. |
| Yield | Some optimizers measure yield differently than others. We measure yield as the following: $$\frac{\text{(Total Length of cut pieces)}}{\text{(Total length of raw material need to cut required pieces)}}$$ |

When using the Maxcuts optimizer, there are several variables used to help achieve the result the user is looking for. Some of the variables are used in several "MaxLook" settings while others are used only once. In some embodiments, "yield" is defined as (total length of cut pieces) divided by (total length of raw (stock) material need to cut required pieces).

TABLE 3

| Variable | Description |
|---|---|
| MaxLookBatch | Indicates how many batches the optimizer can look ahead for parts when cutting the primary batch. If The maxlook setting is set to "2", the optimizer will look ahead 2 batches for additional parts to cut while cutting the primary batch. |
| MaxLookcutoff_type | The main reason for maxlookcutoff_type and maxlookcutoff is to determine which loads do not pass certain conditions (using these variables). If there are loads that do not pass, the optimizer will take the pieces that are supposed to be cut in these loads and look for pieces in other batches (as defined by maxlookbatch) to gain a better optimization.<br>What type of calculation is used on the remaining scrap material. Various settings can be used including labor, etc. but here are the most common ones:<br>"Length" (amount of scrap regardless of how many pieces are cut at a time)<br>"Total Length" (amount of scrap multiplied by the number of pieces being cut)<br>Yield |
| Maxlookcutoff | The value associated with the maxlookcutoff_type. |
| MaxMatch | When looking for identical parts in other batches, if and how to match them up. The following settings indicate how it will be used:<br>1: Only match within a batch<br>2: Match across the entire schedule<br>3: Match across a specific number of batches (indicated in MaxMatchBatch)<br>4: Don't Match |
| MaxMatchBatch | If MaxMatch is set to 3, this tells the software to also use the parameter that specifies how many batches it can look ahead for a match. |
| MatchPlane | For those that specify a plane (i.e., "W" for width, "H" for height, etc.), only match if the setting in the plane column is the same. In some embodiments, the MatchPlane parameter is used to specify other user-specified characteristics other than or in addition to width and height, such as color of the stock material needed, or any other parameter. |
| Max_parts | The number of parts that can be cut at one time on a saw. If the saw can cut 4 parts at a time, the optimizer will look to match parts up to 4. |
| Min_parts | The minimum number of parts that can be cut at one time. In most cases this will be 1. |
| Item_saw_offset | The amount to add or subtract to each cut. This is used in situations where the cut amount may be a finish size (i.e., after weld or processing) yet the actual amount to cut on the saw is +/− a specific amount. |
| MaxSplit | MaxSplit indicates if and how to split quantities into smaller quantities. MaxSplit will take quantities of 4 and make them 2's, 2's and make them 1's, etc. MaxSplit has the following settings:<br>1: Don't Split<br>2: Split based on maxsplit_type and maxsplitmin_cutoff |
| Maxsplit_type | Same explanation as Maxlookcutoff_type. |
| Maxsplit_mincutoff | Same explanation as maxlookcutoff. |
| Useleftover | Indicates on whether or not to use the leftover pieces from previous optimizations (no matter the cost). |
| Leftoveradj | If a leftover piece needs to have an amount added to it or subtracted from it (i.e., additional trim piece or no trim needed), it can be indicated here. |
| Group_type | In some rare cases, you will end up with identical loads at quantities less than the saw is capable of cutting. For example, you may have 2 identical loads at a quantity of 2 but the saw is capable of cutting four-at-a-time.<br>In other cases you may want to optimize a part one-at-a-time but can cut those four-at-a-time. In this case, if the loads are identical, you may as well cut those 4 at a time.<br>Both situations can be indicated through these settings:<br>0: Group up to the max_cuts setting<br>1: Group up to a specific setting as indicated by group_parts<br>2: Don't group |
| Group_parts | The number of parts to group up until if the group_type setting is set to 1. |
| Scrap_end | Amount of scrap the saw requires to be at the end of a stock piece. Also known as trailing scrap. |
| Scrap_middle | Amount of scrap required between two cuts. |
| Scrap_lead | Amount of scrap the saw requires at the start of a piece. Also known as trim cut. |
| Scrap_reusesize | Indicates a point at which to save the remaining pieces for later. If this is set to 50 inches and there is 60 inches left at the end of a load, the optimizer will indicate that this piece should be saved. |

Setting Descriptions for Maxcuts Continuous-Flow Optimization

Table 4 shows MaxLook (by item) (MaxLook). MaxLook helps define the population of data the optimizer looks at. It can look at the entire schedule (the entire population of data) or ways to do the individual batch.

TABLE 4

| MaxLook Setting | Description | What it does |
|---|---|---|
| 0 | Use Saw Default | The following variables are used off of the saw table:<br>Maxlook<br>Maxlookbatch<br>Maxlookcutoff |
| 1 | Entire Schedule | Optimizes the entire schedule and then, based on the setting in MaxLookSched, decides on where to cut the material. |
| 2 | Individual Batches down to Minimum Cuts use MaxLookBatch for knowing how far to look ahead in batches use MaxLookCutoff_type and MaxLookCutoff to determine which ones don't make it most popular option for straight cuts | 1. Performs MaxMatch<br>2. Optimizes in batch<br>3. Verifies<br>4. Splits in Batch<br>5. Perform steps 2-4 until down to minimum cuts<br>6. At the Minimum cuts level, optimizes across the entire schedule |
| 3 | Individual Batches across Batches use same options as in number 2 this is the most popular option for frame/sash | 1. Perform MaxMatch<br>2. Optimize Batch at MaxCut Setting<br>3. Verify<br>4. Optimize Batch across Batches<br>5. Split in batches<br>6. Perform steps 2-5 until down to minimum cuts |
| 4 | Group number of batches together (based on Maxlookbatch) with this option you don't look ahead when a layout fails | |
| 5 | Individual Batch Only (do not optimize across batches) | If this is set, MaxMatch should be set to only match within a batch. |
| 6 | Rolling Batch | |
| 7 | Individual batches at max cuts setting, then across all batches | |

In some embodiments, the value for maxlookcutoff should be less than the value for min_cutoff (used for splitting)

TABLE 5

MaxMatch

| MaxMatch Setting | Description | What it does |
|---|---|---|
| 0 | Use Saw Default | |
| 1 | Match only within a batch | Only looks for same size cuts within the batch |
| 2 | Match across the entire schedule (priority given with a batch) | Considers the entire schedule when matching |
| 3 | Match across batches but limited to setting in MaxMatchBatch | Will look to match across the number of batches the user indicates |
| 4 | Do not match | |

Match_Plane: Allow matching widths and heights or other user-specified data (default yes). In some embodiments, this is not used.

Sawmax_defaults: Use defaults on the saw for max and min parts settings

Max_parts: Maximum Number of Pieces to cut at one time

Min_parts: Minimum Number of Pieces to cut at one time

TABLE 6

MaxSplit (MaxSplit) (Indicates when to turn cutting 4-at-a-time into cutting 2-at-a-time, etc.)

| MaxSplit Setting | Description |
|---|---|
| 0 | Use Saw Default |
| 1 | Do not Split |
| 2 | Base the split on: maxSplit_type: based on total scrap, length maxsplitMin_cutoff: setting | useleftover: Recycle leftover pieces leftoveradj: End trim adjustment value (used for when a piece is leftover . . . this calculates how much to subtract to make it usable again) (leftoveradj). This allows the user to add back a length corresponding to the trim cut that might otherwise be done, or to subtract a length for damaged portions.

TABLE 7

Group_Type (matching identical layouts up to a specific setting),. If two layouts are exactly the same and would be cut at one-at-a-time, MaxGroup will instead cut them two-at-a-time.

| Group_type Setting | Description |
|---|---|
| 0 | Group up to the MaxCuts Setting |
| 1 | MaxGroup to this setting: Group parts: Setting to group up to (should be greater than maxcuts) |
| 2 | Don't use MaxGroup |

Sawscrap Defaults

If the sawscrap_defaults is set to true, the following are used off of the saw defaults:

Scrap_lead

Scrap_middle

Scrap_end

This field is used in some embodiments to provide default lengths for saw table information (such as a lead scrap length of 0.25 cm, middle scrap length of 3 cm, and an end scrap length of 1 cm).

Maxcuts Field Data

TABLE 8A

Saw_id_report Table Layout

| # | Name | Type | Length | Description |
|---|---|---|---|---|
| 1 | Saw_rep_code | Character | 8 | Unique identifier for saw |
| 2 | saw_rep_desc | Character | 20 | Description for saw |
| 3 | station_type | Character | 10 | Type of station (all are saw) |
| 4 | station_line | Character | 10 | Manufacturing line the saw is on. |
| 5 | releasewithline | Logical | 1 | Internal use |
| 6 | saw_rep_optimize | Logical | 1 | If trueoptimize the parts that are assigned to the saw |
| 7 | saw_file | Character | 8 | Output file information |
| 8 | export_loc | Logical | 1 | Output file information |
| 9 | icart_bins | Integer | 4 | Continuous flow optimization setting |
| 10 | ithreshold | Integer | 4 | Continuous flow optimization setting |
| 11 | saw_export | Character | 10 | Output file information |
| 12 | scrap_lead | Numeric | 6.3 | Default for lead scrap |
| 13 | scrap_middle | Numeric | 6.3 | Default for middle scrap |
| 14 | scrap_end | Numeric | 6.3 | Default for end scrap |
| 15 | Item_saw_offset | Numeric | 6.3 | Default for item_saw_offset |
| 16 | Maxlook | Numeric | 2 | Default for maxlook setting |
| 17 | Maxlooksched | Numeric | 2 | Default for maxlooksched |
| 18 | Maxlookbatch | Numeric | 2 | Default for maxlookbatch |
| 19 | Maxlookcutoff | Numeric | 3 | Default for maxlookcutoff |
| 20 | Maxlookcutoff_type | Numeric | 2 | Default for maxlookcutoff_type |
| 21 | Maxmatch | Numeric | 2 | Default for maxmatch |
| 22 | Maxmatchbatch | Numeric | 2 | Default for maxmatchbatch |
| 23 | max_parts | Numeric | 2 | Default for maximum number of pieces the saw can cut at once |
| 24 | min_parts | Numeric | 2 | Default for minimum number of pieces the saw can cut at once |
| 25 | Match_plane | Logical | 1 | Default for match_plane |
| 26 | split_type | Character | 25 | Split typecan be scrap lengthtotal scrap lengthtotal scrap valuelaboretc. |
| 27 | min_cutoff | Numeric | 3 | Decision criteria for split type |
| 28 | Group_type | Numeric | 2 | Default for group_type |
| 29 | Group_parts | Numeric | 2 | Default for group_parts |
| 30 | Useleftover | Logical | 1 | Default for useleftover |
| 31 | Leftoveradj | Numeric | 6.3 | Default for leftoveradj |
| 32 | itemlength | Numeric | 7.3 | Default item length |
| 33 | repprocess_output | Character | 15 | Output file information |
| 34 | reppicklist_output | Character | 15 | Output file information |
| 35 | repcutlist_output | Character | 15 | Output file information |

TABLE 9A

Vlop_itm_saw table layout

| # | Name | Type | Length | Description |
|---|---|---|---|---|
| 1 | saw_rep_code | Character | 8 | Identifier for saw |
| 2 | item | Character | 15 | Item |
| 3 | sawssrap_defaults | Logical | 1 | If true, use the defaults found in saw_id_report |
| 4 | scrap_lead | Numeric | 6.3 | Lead scrap |
| 5 | scrap_middle | Numeric | 6.3 | Middle scrap |
| 6 | scrap_end | Numeric | 6.3 | End scrap |
| 7 | item_saw_offset | Numeric | 7.3 | + or – to add to each piece |
| 8 | Maxlook_defaults | Logical | 1 | If true, use the defaults found in saw_id_report |
| 9 | Maxlook | Numeric | 2 | Setting for maxlook setting |
| 10 | Maxlooksched | Numeric | 2 | Setting for maxlooksched |
| 11 | Maxlookbatch | Numeric | 2 | Setting for maxlookbatch |

TABLE 9A-continued

Vlop_itm_saw table layout

| # | Name | Type | Length | Description |
|---|------|------|--------|-------------|
| 12 | Maxlookcutoff_type | Numeric | 2 | Setting for maxlookcutoff_type |
| 13 | Maxlookcutoff | Numeric | 3 | Setting for maxlookcutoff |
| 14 | Maxmatch_defaults | Logical | 1 | If true, use the defaults found in saw_id_report |
| 15 | Maxmatch | Numeric | 2 | Setting for maxmatch |
| 16 | Maxmatchbatch | Numeric | 2 | Setting for maxmatchbatch |
| 17 | sawmax_defaults | Logical | 1 | Use defaults on saw for max, min parts |
| 18 | max_parts | Numeric | 2 | Maximum number of item that can be cut at one time |
| 19 | min_parts | Numeric | 2 | Minimum number of item that can be cut at one time |
| 20 | maxsplit_defaults | Logical | 1 | If true, use saw split defaults |
| 21 | Maxsplit | Numeric | 2 | |
| 22 | split_type | Character | 25 | Split type (same as on saw_id_report) |
| 23 | min_cutoff | Numeric | 3 | Decision criteria for split type |
| 24 | Group_type | Numeric | 2 | Setting for group_type |
| 25 | Group_parts | Numeric | 2 | Setting for group_parts |
| 26 | Useleftover | Logical | 1 | Setting for useleftover |
| 27 | Leftoveradj | Numeric | 6.3 | Setting for leftoveradj |

TABLE 10

Vlop_itm_stocks Table

| # | Name | Type | Length | Description |
|---|------|------|--------|-------------|
| 1 | saw_rep_code | Character | 8 | 0 Identifier for saw, if blank this stock can be used at all saws |
| 2 | item | Character | 15 | 0 Item |
| 3 | Itemqty | Integer | 4 | Quantity of item in this length, if −1 there is an unlimited quantity available |
| 4 | Itemlength | Numeric | 7.3 | 3 Length of item |
| 5 | Itemcost | Numberic | 7.3 | 3 Cost of item (optional) |

TABLE 10B

Sawfile_cur Cursor Layout order_no C(20)
line_num C(1)
type_code C(15)
item_no C(15)
orig_cut_qty N(4)
cut_qty N(4)
plane C(1)
cut_size N(8,3)
lite_cd C(1)
re_lite_cd C(1)
box_no N(3)
saw_rep_code C(8)
box_memo M
box_short C(30)
saw_model C(20)
material_name C(20)
notes1_memo M
notes1_short C(20)
notes2_memo M
notes2_short C(20)
CRC N(1)
add_steps N(1)
steps C(40)
sort_ord N(4)
layout_num N(4)
layoutcut_ord I

TABLE 10B-continued

Sawfile_cur Cursor Layout layout_length N(8,4)
layout_left N(8,4)
uniqueid I
uniqueid_memo M

Figure 2:
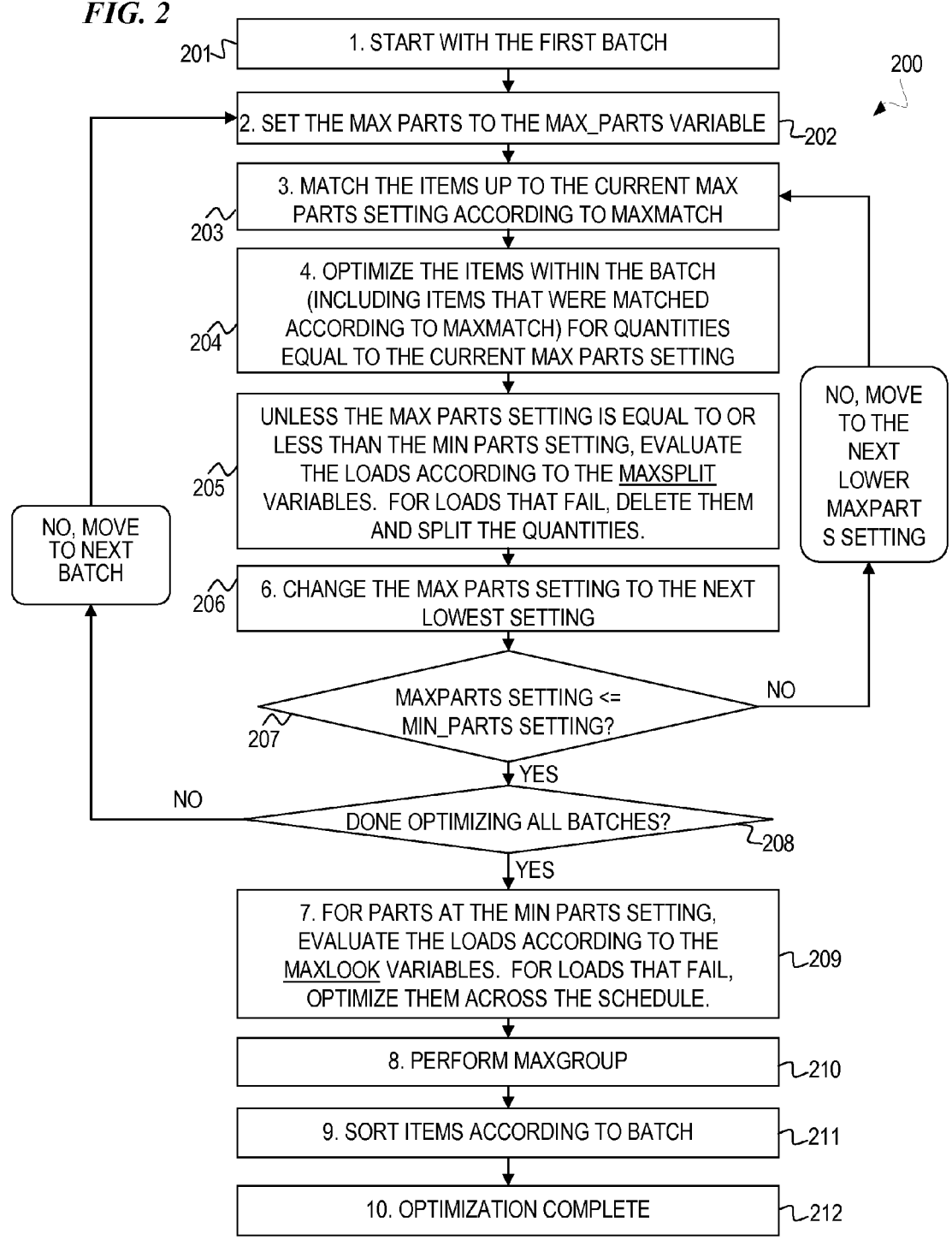
FIG. 2 is a flowchart describing an algorithm 200.
Figure 3:
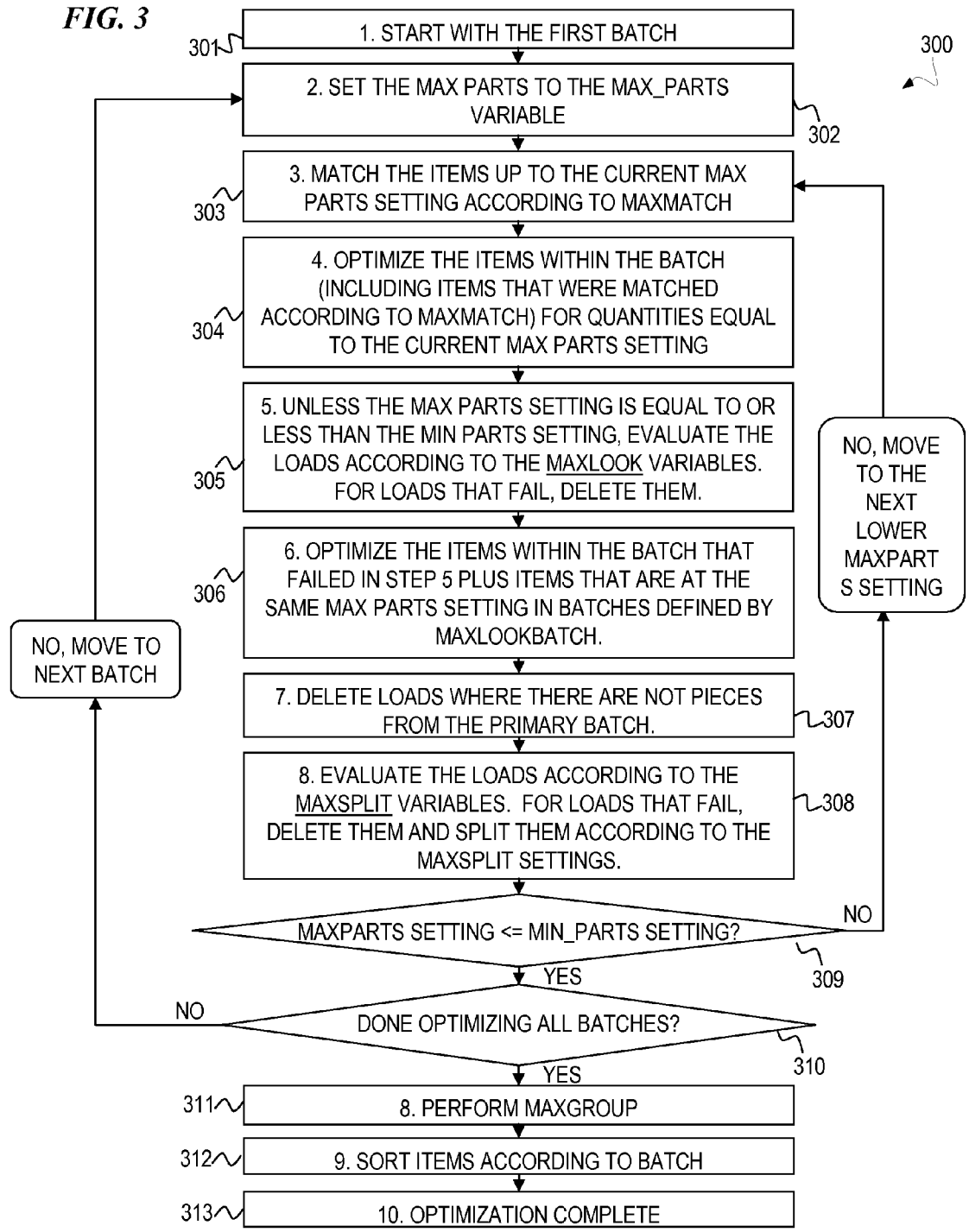
FIG. 3 is a flowchart describing an algorithm 300.
Figure 4:
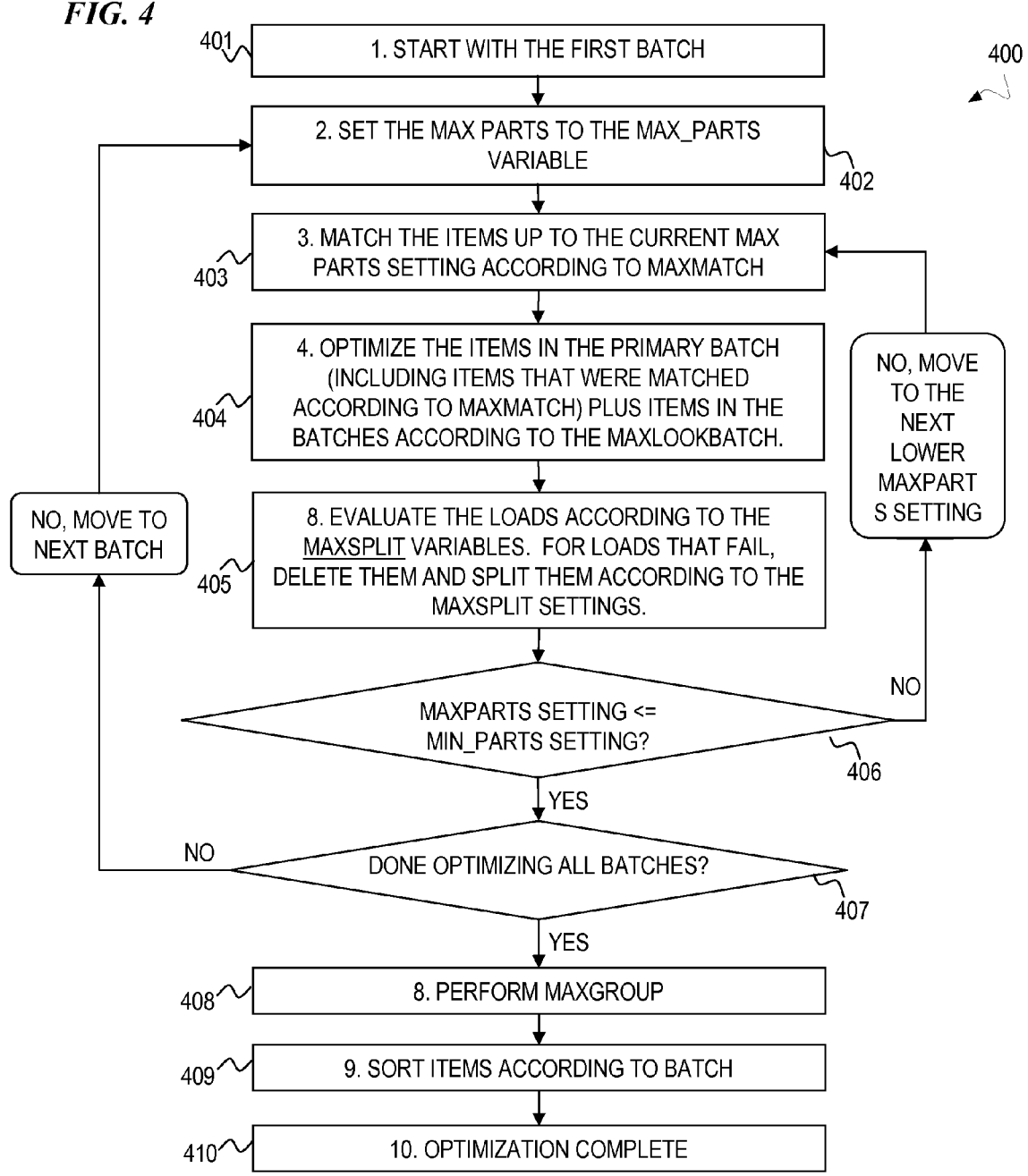
FIG. 4 is a flowchart describing an algorithm 400.
Figure 5:
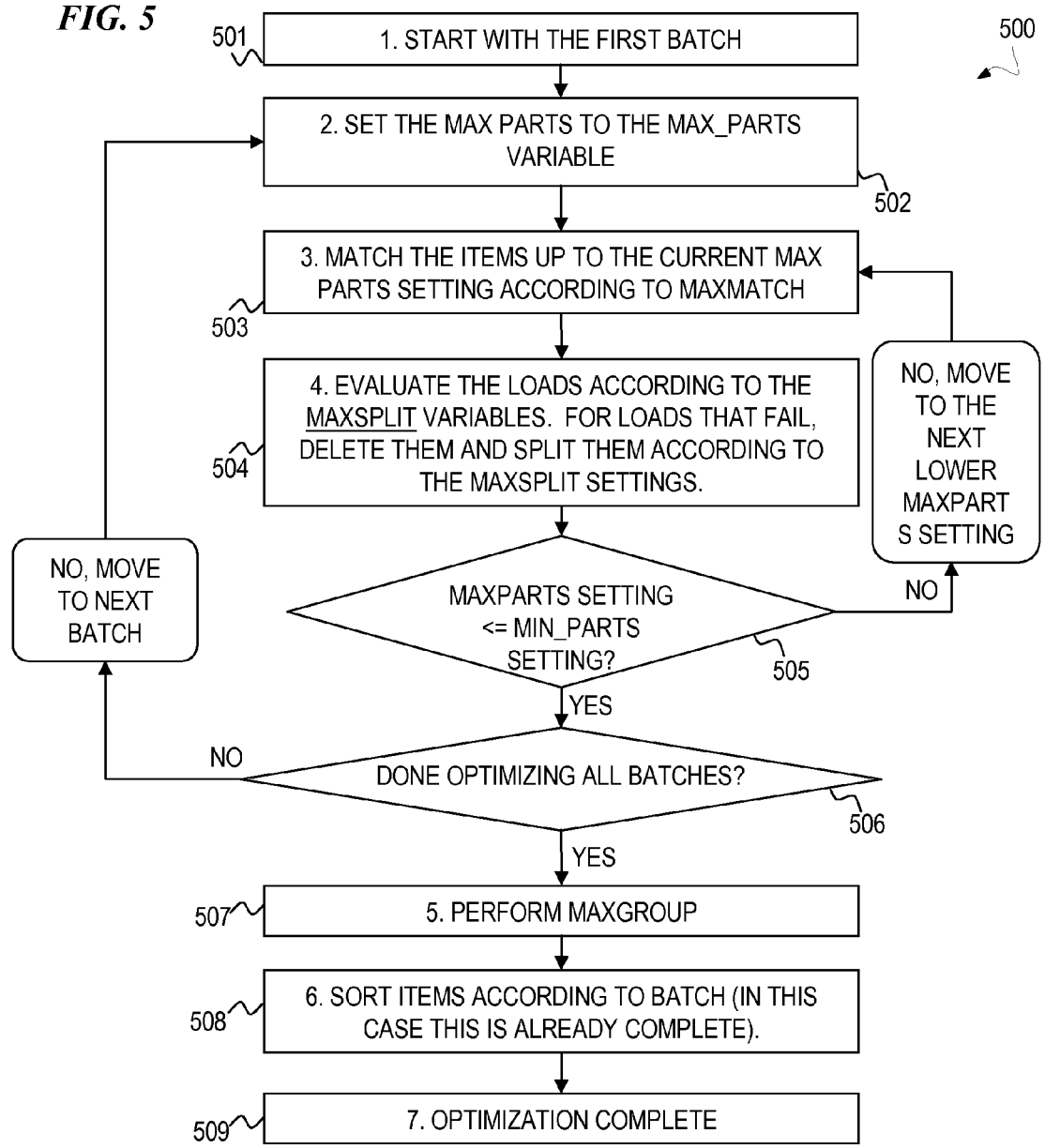
FIG. 5 is a flowchart describing an algorithm 500.
Figure 6:
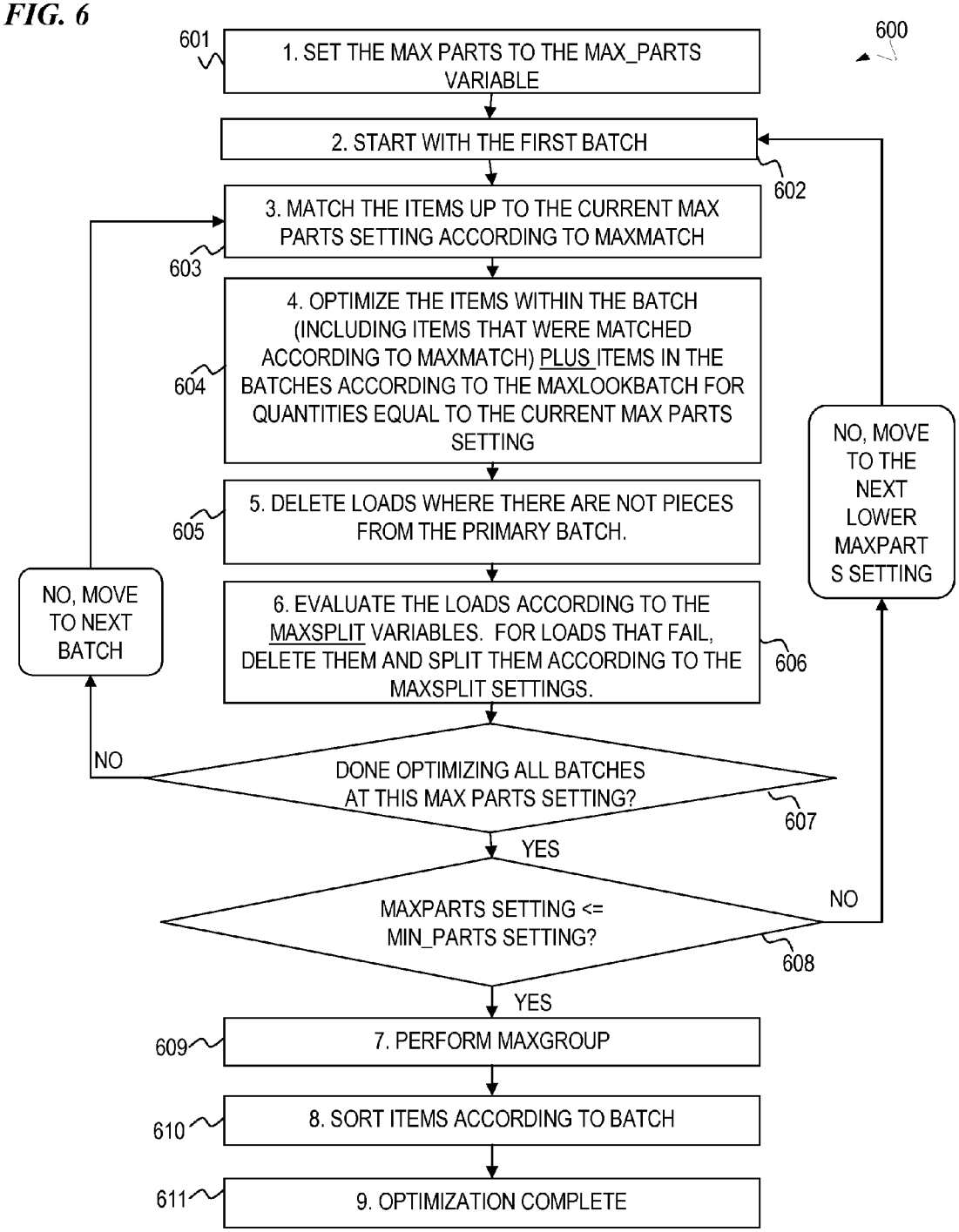
FIG. 6 is a flowchart describing an algorithm 600.

TABLE 10C remain_stocks_cur Cursor Layout ibatch_id I
saw_rep_code C(8)
ITEM C(15)
layout_num I
cut_qty I
cut_layout N(8,3)
layout_length N(8,3)
layout_left_qty I
layout_left N(8,3)
layout_note C(20)
saw_cuts I In some embodiments, the overall algorithm is controlled by the maxlook setting, wherein if the maxlook setting is 1, then the functions of FIG. 1 are executed; if the maxlook setting is 2, then the functions of FIG. 2 are executed; if the maxlook setting is 3, then the functions of FIG. 3 are executed; if the maxlook setting is 4, then the functions of FIG. 4 are executed; if the maxlook setting is 5, then the functions of FIG. 5 are executed; and if the maxlook setting is 6, then the functions of FIG. 6 are executed.

Algorithm for Optimizing by Entire Schedule

FIG. 1 is a flowchart describing an algorithm 100 used in some embodiments for optimizing an individual batch down to minimum cuts based upon an entire schedule (i.e., where the maxlook variable has been entered as one (1)). In some embodiments, the algorithm includes functions of setting 101 the maximum number of parts (max parts) to the max_parts variable; matching 102 the items up to the current max parts setting according to MaxMatch; optimizing 103 the items across the schedule for quantities equal to the current max parts setting; evaluating 104 the loads according to the max-split variables and for loads that fail the evaluation, deleting those loads and splitting the parts from those loads to a lower quantities value; changing 105 the max parts setting to the next lowest setting; determining 106 whether maxparts setting is less than one (1) and if not, branching back to function 102, and if so continuing to function 107; performing 107 the maxgroup function; sorting 108 items according to batch; and completing 109 optimization. Further regarding the evaluation and splitting, for example, if at a cut quantity of four parts cut per saw cycle, the scrap might be 50 cm but the acceptable value is 30 cm, then that load would be split into quantities of two parts cut per saw cycle (or reverted back to their original cut quantity and rematched again) and those smaller quantities of parts would then be optimized in a later iteration of the method.

Algorithm for Optimizing by Max Cuts in Batch

FIG. 2 is a flowchart illustrating an algorithm 200 for optimizing within each batch first and then performing the necessary splitting within the batch, and, when the optimizer is at the minimum cuts setting, looking across the batches for additional parts (i.e., where the maxlook variable has been entered as two (2)). In some embodiments, the algorithm includes functions of starting 201 with the first batch; setting 202 the max parts to the max_parts variable; matching 203 the items up to the current max parts setting according to Max-Match; optimizing 204 the items within the batch (including items that were matched according to MaxMatch) for quantities equal to the current max parts setting; unless the max parts setting is equal to or less than the min parts setting, evaluating 205 the loads according to the maxsplit variables, and for loads that fail, deleting them and splitting the quantities; changing 206 the max parts setting to the next lowest setting; determining 207 whether Maxparts setting is less than or equal to min_parts setting and if not, branching back to function 203, and if so continuing to function 208; determining 208 whether done optimizing all batches and if not, moving on to next batch and starting that next batch at function 202, and if so continuing to function 209; for parts at the min parts setting, evaluating 209 the loads according to the maxlook variables, and for loads that fail, optimizing them across the schedule; performing 210 MaxGroup; sorting 211 items according to Batch; and completing 212 optimization.

Algorithm for Optimizing by Max Cuts Across Batches

FIG. 3 is a flowchart describing an algorithm 300 for optimizing within each batch first at the highest maxcuts setting and then looking for parts in other defined batches, and, when the optimizer is at the minimum cuts setting, looking across the batches for additional parts (i.e., where the maxlook variable has been entered as three (3)). In some embodiments, the algorithm includes functions of starting 301 with the first batch; setting 302 the max parts to the max_parts variable; matching 303 the items up to the current max parts setting according to MaxMatch; optimizing 304 the items within the batch (including items that were matched according to MaxMatch) for quantities equal to the current max parts setting; unless the max parts setting is equal to or less than the min parts setting, evaluating 305 the loads according to the maxlook variables, and for loads that fail, deleting them; optimizing 306 the items within the batch that failed in function 305 plus items that are at the same max parts setting in batches defined by maxlookbatch; deleting 307 loads where there are not pieces from the primary batch; evaluating 308 the loads according to the maxsplit variables, and for loads that fail, deleting them and splitting them according to the maxsplit settings; determining 309 whether Maxparts setting is less than or equal to the min_parts setting, and if not, branching back to function 303, and if so continuing to function 310; determining 310 whether done optimizing all batches, and if not, moving on to next batch and starting that next batch at function 302, and if so continuing to function 311; performing 311 MaxGroup; sorting 312 items according to Batch; and completing 313 optimization.

Algorithm for Optimizing by Group Batches Together

FIG. 4 is a flowchart describing an algorithm 400 for optimizing across a specific number of batches and treating them as one (i.e., where the maxlook variable has been entered as four (4)). In some embodiments, the algorithm includes functions of starting 401 with the first batch; setting 402 the max parts to the max_parts variable; matching 403 the items up to the current max parts setting according to MaxMatch; optimizing 404 the items in the primary batch (including items that were matched according to MaxMatch) plus items in the batches according to the maxlookbatch; evaluating 405 the loads according to the maxsplit variables, and for loads that fail, deleting them and splitting them according to the maxsplit settings; determining 406 whether Maxparts setting is less than or equal to min_parts setting, and if not, branching back to function 403, and if so continuing to function 407; determining 407 whether done optimizing all batches, and if not, moving on to the next batch and starting that next batch at function 402, and if so continuing to function 408; performing 408 MaxGroup; sorting 409 items according to Batch; and completing 410 optimization.

Algorithm for Optimizing by Individual Batch Only

FIG. 5 is a flowchart illustrating an algorithm 500 for optimizing across a specific number of batches and treating them as one (i.e., where the maxlook variable has been entered as five (5)). In some embodiments, the algorithm includes functions of starting 501 with the first batch; setting 502 the max parts to the max_parts variable; matching 503 the items up to the current max parts setting according to MaxMatch; evaluating 504 the loads according to the maxsplit variables, and for loads that fail, deleting them and splitting them according to the maxsplit settings; determining 505 whether Maxparts setting is less than or equal to min_parts setting, and if not, branching back to function 503, and if so continuing to function 506; determining 506 whether done optimizing all batches, and if not, moving on to the next batch and starting that next batch at function 502, and if so continuing to function 507; performing 507 MaxGroup; sorting 508 items according to Batch (in this case this is already complete); and completing 509 optimization.

Algorithm for Optimizing by Rolling Batch

FIG. 6 is a flowchart illustrating an algorithm 600 for optimizing within each batch first at the highest maxcuts setting and then looking for parts in other defined batches, and optimizing at the highest setting across all of the batches before moving to the next lower maxcuts setting (i.e., where the maxlook variable has been entered as six (6)). In some embodiments, the algorithm includes functions of starting 601 with the first batch; setting 602 the max parts to the max_parts variable; matching 603 the items up to the current max parts setting according to MaxMatch; optimizing 604 the items within the batch (including items that were matched according to MaxMatch) plus items in the batches according to the maxlookbatch for quantities equal to the current max parts setting; deleting 605 loads where there are not pieces from the primary batch; evaluating 606 the loads according to the maxsplit variables, and for loads that fail, deleting them and splitting them according to the maxsplit settings; determining 607 whether done optimizing all batches at this max parts setting, and if not, moving on to the next batch and starting that next batch at function 602, and if so continuing to function 608; determining 608 whether Maxparts setting is less than or equal to min_parts setting, and if not, branching back to function 601, and if so continuing to function 609; performing 609 MaxGroup; sorting 610 items according to Batch; and completing 611 optimization.

In some embodiments, the method for optimizing includes: selecting a first record set of materials to optimized, sending the first record set of materials to an optimizer, selecting various optimization parameters, getting a second record set of materials for an optimizer, optimizing the first record set using the second record set, removing records that are not used in the optimization of the first record set from the second record set of materials, cutting physical materials corresponding to the first record set of optimized records, and updating the second record set based upon what was not removed from the second record set of materials. In some embodiments, the materials to be cut as described in this algorithm include window-framing materials that are to be cut to form portions of a window frame. In some embodiments, the window frame includes a sash, stile, and/or transom.

In some embodiments, the present invention provides an apparatus that includes: an input component configured to receive data relating to cutting, a selection component configured to receive input indicating a selection of one or more optimization parameters, an optimization component that indicates a grouping of materials to be cut, and a control interface that provides signals to control a cutting device. In some embodiments, the apparatus includes a cutting device that includes a saw.

In some embodiments, the present invention provides a method for optimizing that includes grouping a maximum quantity of materials to be cut, determining a value representing a maximum number of materials that can be cut at one time (a value that, in some embodiments, is provided by the user), splitting the materials into a plurality of groups that a saw can cut, grouping similar quantities that can be cut at the same time, optimizing a highest number of cuts, and splitting some of the materials into a next additional group for cutting at a different time. In some embodiments, the actual physical cutting of the materials can occur at or after the optimization stage. In some embodiments, a database is updated at or after the second splitting stage.

A System Implementing a Batching Algorithm

In some embodiments, a saw is operatively coupled to a computer system, which controls the saw according to the output of the optimizer.

Figure 7:
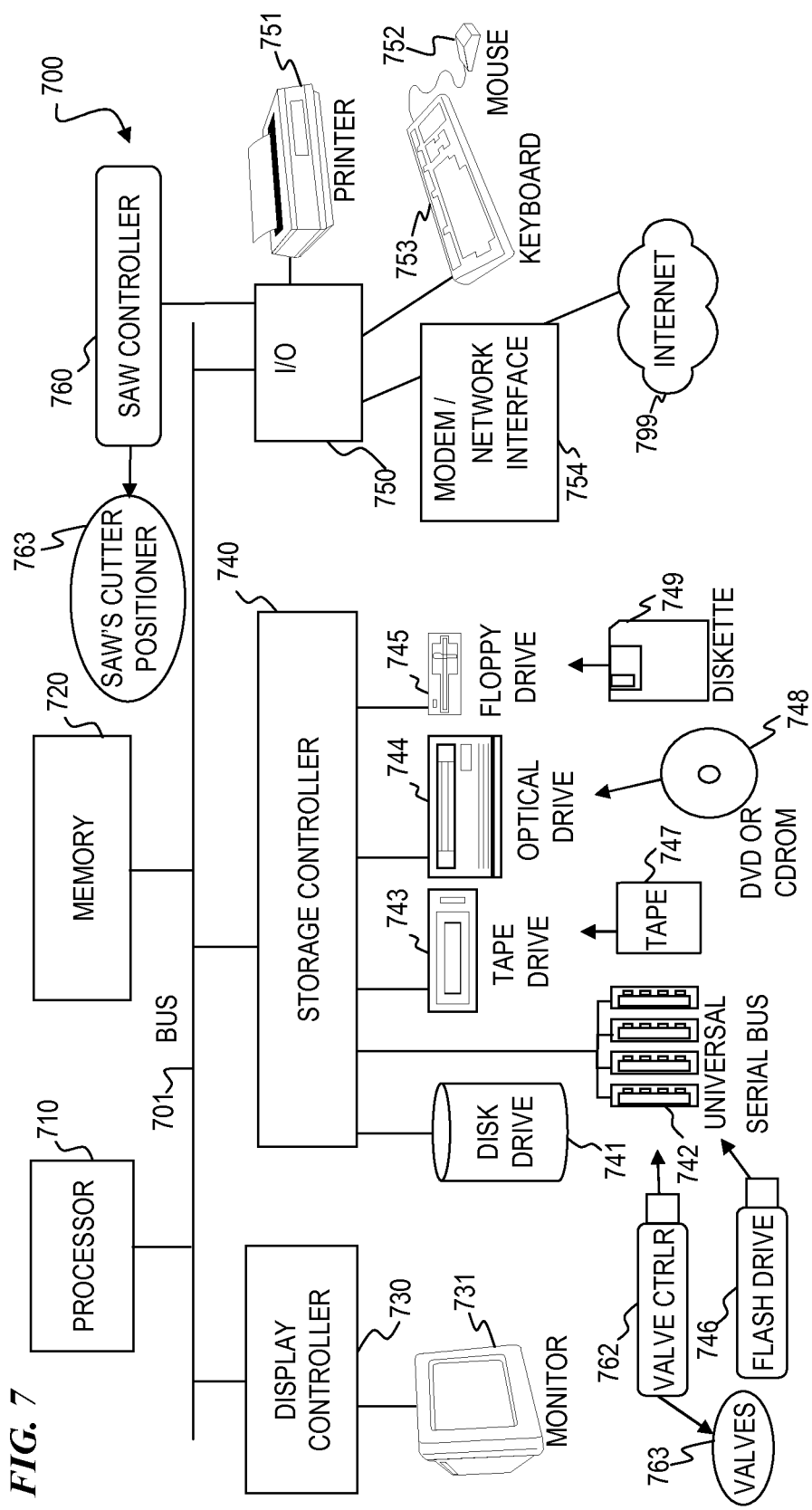
FIG. 7 is a block diagram of one embodiment of an information processor 700.

FIG. 7 is a block diagram of one embodiment of an information processor 700 used in some embodiments to execute algorithm 100, 200, 300, 400, 500, and/or 600. In some embodiments, the algorithms are executed by a digital processing system or computer 700 that includes a processor 710, which may represent one or more processors each having one or more cores, and may include one or more conventional types of such processors (e.g., Athlon® 64, Opteron®, Sempron®, Pentium® 4, Pentium® D, or Efficeon™), such as are available from companies such as AMD, Intel, Transmeta or the like. In some embodiments, a memory 720 is coupled to the processor 710 by a bus 701. In some embodiments, memory 720 includes dynamic random access memory (DRAM) and/or static RAM (SRAM). In some embodiments, processor 710 may also be coupled to other types of memories (e.g., cache, FLASH memory, disk, etc.), which could be considered as part of the memory 720 or separate from the memory 720.

The bus 701 further couples the processor to a display controller 730 (for driving a visual display on monitor 731), a storage controller 740 (for reading and writing data from and to mass memory (e.g., disk drive(s) 741, Universal Serial Bus (USB) interfaces 742 for connecting to a variety of external devices such as flash drive 746, tape drive 743 that accepts tape cassette 747, optical drive 744 that accepts optical media such as DVDs or CDROMs 748, and/or floppy drive that accepts diskettes 749, and/or some other type of computer-readable media device), and an input/output (I/O) controller 750 that drives modem or network interface 754 for connecting to the internet 799, one or more keyboard 753 and mouse 752 and/or other trackball or other pointing devices, and/or printer 751 as well as scanners, digital cameras (e.g., used for machine vision processes to obtain information needed to control processes), microphones, and the like. Computer-readable media 746, 747, 748, and/or 749 may include a magnetic, optical, magneto-optical, tape, and/or other type of machine-readable media/device for storing information.

In some embodiments, the above-described saw and computer system are remotely operated via a wide-area network (WAN) or local-area network (LAN) or a collection of WANs and LANs collectively referred to as the internet 799. In some embodiments, such a remote operation may involve the use of various protocols to allow for communication between the computer system managing the saw, and other computer systems. Such protocols may include TCP/IP, UDP/IP or the like and these protocols may, in some embodiments, be organized along with other technologies according to a TCP/IP protocol stack schema or OSI model as is known in the art. (See *Computer Networking: A Top-Down Approach Featuring the Internet* $2^{nd}$ *Edition*, James F. Kurose and Keith W. Ross, 2003.) In some embodiments, a saw and associated computer system may have an internet protocol (IP) address that allows them to receive instructions when connected to network. In some embodiments, a MAC address may be used to identify the saw and associated computer systems. In still other embodiments, another manner of identification may be used.

In some embodiments, the present invention may be implemented entirely in executable computer program instructions that are stored on computer-readable media 746, 747, 748, and/or 749 or may be implemented in a combination of software and hardware, or in certain embodiments, entirely in hardware. Embodiments within the scope of the present invention include computer-readable media for carrying or having computer-executable instructions or data structures stored thereon used to implement or control the processes described herein. Such computer-readable media may include any available medium, including storage accessed across the internet, that is accessible by a general-purpose or special-purpose computer system. When processed data is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above are also be included within the scope of computer-readable media. Computer-executable or computer-readable instructions include, for example, instructions and data which cause a general-purpose computer system or special-purpose computer system to perform a certain function or group of functions. The computer-executable or computer-readable instructions may be, for example, binaries, intermediate format instructions such as assembly language, or even interpreted source code.

In this description and in the following claims, a computer system is defined as one or more software modules, one or more hardware modules, or combinations thereof, that work together to perform operations on electronic data and generate outputs. For example, the definition of computer system includes the hardware modules of a personal computer, as well as software modules, such as the operating system of the personal computer. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer-system configurations, including hubs, routers, wireless access points (WAPs), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed-system environments where local and remote computer systems, which are linked (either by hardwired, wireless, or a combination of hardwired and wireless connections) through a network, such as but not limited to the internet, both perform tasks. In a distributed-system environment, program modules may be located in both local and remote memory-storage devices.

A Three-Tier Architecture

In various embodiments, the present invention can be implemented in any suitable computer system or programming environment. For example, in some embodiments, the present invention can be implemented as a software application designed under a three-tier software architecture paradigm whereby various modules of computer code can be categorized as belonging to one or more of these three tiers. A three-tier software architecture is known in the art. (See *Applying UML and Patterns: An Introduction to Object-Oriented Analysis and Design and the Unified Process* 2nd Edition, by Craig Larman, Prentice Hall, 2002.) These three tiers, in some embodiments, may reside on one computer system, or may be distributed amongst a number of computer systems. The first tier is an Interface level that is relatively free of application processing. The second tier is a Logic level that performs processing in the form of logical/mathematical manipulations (Logical Manipulations) of data inputted, in some embodiments, through the Interface level, and communicates the results of these manipulations with the Interface and/or back-end or Storage Level. In some embodiments, these Logical Manipulations relate to certain business rules or tasks that govern the application as a whole. In some embodiments, these Logical Manipulations and associated business rules relate to cutting-stock optimization. The Storage Level is a persistent, or, in some embodiments, a non-persistent storage medium. In some embodiments, one or more of these tiers is collapsed into another resulting in a two-tier architecture, or one-tier architecture. For example, the Interface and Logic levels may be consolidated, or the Logic and Storage levels may be consolidated as in the case of an application with an embedded database. This three-tier architecture may be implemented using one technology or, as will be discussed below, a variety of technologies. These technologies may include one or more object-oriented programming languages such as, for example, Java™, C++, Fox Pro™, Delphi™, C#™ or the like. Additional structured programming languages such as, for example, C may also be used. Moreover, scripting languages such as, for example, Perl, Python, PHP, JavaScript or VBScript may also be used.

An Interface Level

In some embodiments, a graphical user interface (GUI) is used and is implemented via software such as a Java Servlet, Applet, FoxPro form or VB Script form, to name a few. In other embodiments, a command-line interface is used. These objects, and the routines governing them, allow a user to retrieve, input, or delete content, just to name a few of the functions. For example, in some embodiments, a user will be prompted with a series of text boxes into which information relating to a maximum number of cuts, minimum number of cuts, a minimum cutoff value, and a layout value may be placed. In some embodiments, this information may be provided via a radio button, scroll-down menu or some other method known in to the art. The verification of the information provided via a text box or other method may take place at the Logic level outlined below.

A Logic Level

In some embodiments, the Logic level is governed by a driver function that determines when and how certain subroutines are executed. This Logic level can be written using one of the above-mentioned object-oriented, scripting, or structured programming languages. For example, once the logic of a driver function determines that data has been entered into a text box, this data is then analyzed and certain calculations are made based upon the data, calculations including, for example, the most optimum way to group certain pieces of materials prior to cutting. In some embodiments, one or more of the above-described algorithms is implemented at this level. In some embodiments, the driver function will call certain subroutines in the form of functions that are passed arguments and which return values based upon these arguments. In some embodiments, no values are returned. In some embodiments, the subroutines and/or the driver function interact with a storage level when data is retrieved from the storage level and/or provided to the storage level to update the data contained in this storage level.

A Storage Level

In some embodiments, a storage level is implemented whereby tables of data are created, and data inserted into or selected from these tables using a Structured Query Language (SQL) or some other database-related language known in the art. (See *The Fundamentals of Database Systems* 3rd Edition, by Remez Elmasri & Shamkant B. Navathe, Addison-Wesley, 2000.) These tables of data can be managed using a database application such as, for example, MySQL™, SQL Server™, or Oracle 9i™ or 10g™, just to name a few. In some embodiments, a native database is employed as a part of a single application. These tables, in some embodiments, are organized into a relational-database schema (RDS) or object-relational-database schema (ORDS) as is known in the art. (See id.) In some embodiments, these schemas can be normalized using certain normalization algorithms to avoid abnormalities such as non-additive joins and other problems. In some embodiments, these normalization algorithms include Boyce-Codd Normal Form or some other normalization, optimization algorithm known in the art. (See id.) For example, in some embodiments, data relating to pieces of material (e.g., component materials) that can be used for future optimizations are stored in a database, and pieces that have been used for optimization are removed from the database table.

Example Schematics and Use Cases

Figure 8:
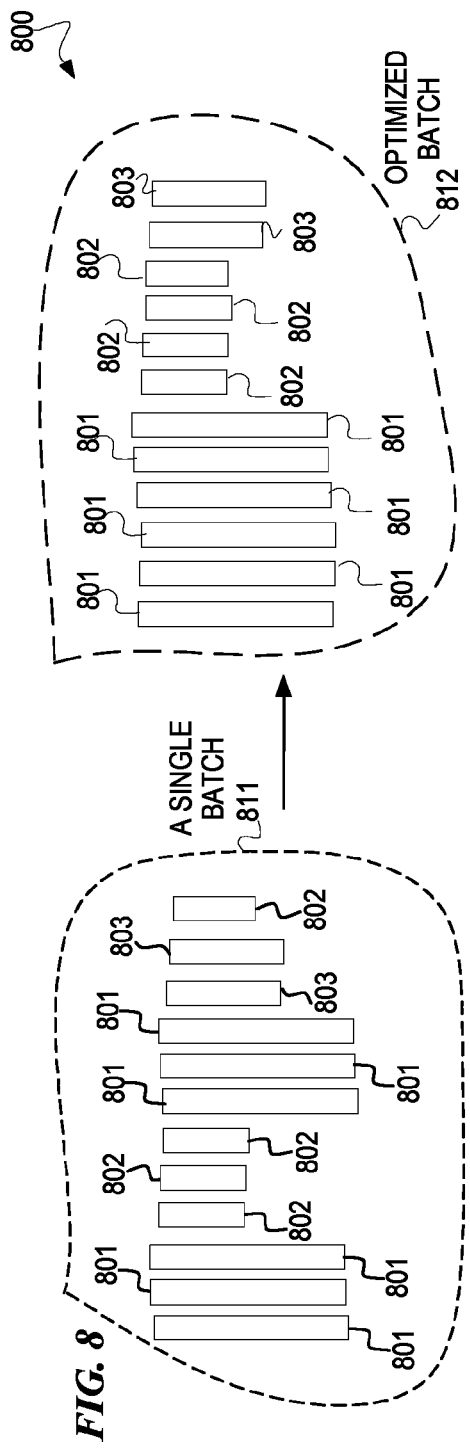
FIG. 8 is a schematic 800 of a single batch optimization.

FIG. 8 is a schematic 800 of a single batch optimization. In some embodiments, a single batch 811 contains numerous component materials (e.g., portions of wooden frames) of differing sizes. For example, described is a mixed set of numerous component materials 801 (e.g., longer pieces all of a first length), 802 (e.g., shorter pieces all of a second length) and 803 (e.g., middle-length pieces all of a third length). In some embodiments, this single batch of component materials is optimized such that it becomes an optimized batch 812 wherein pieces of each length are sorted.

Figure 9:
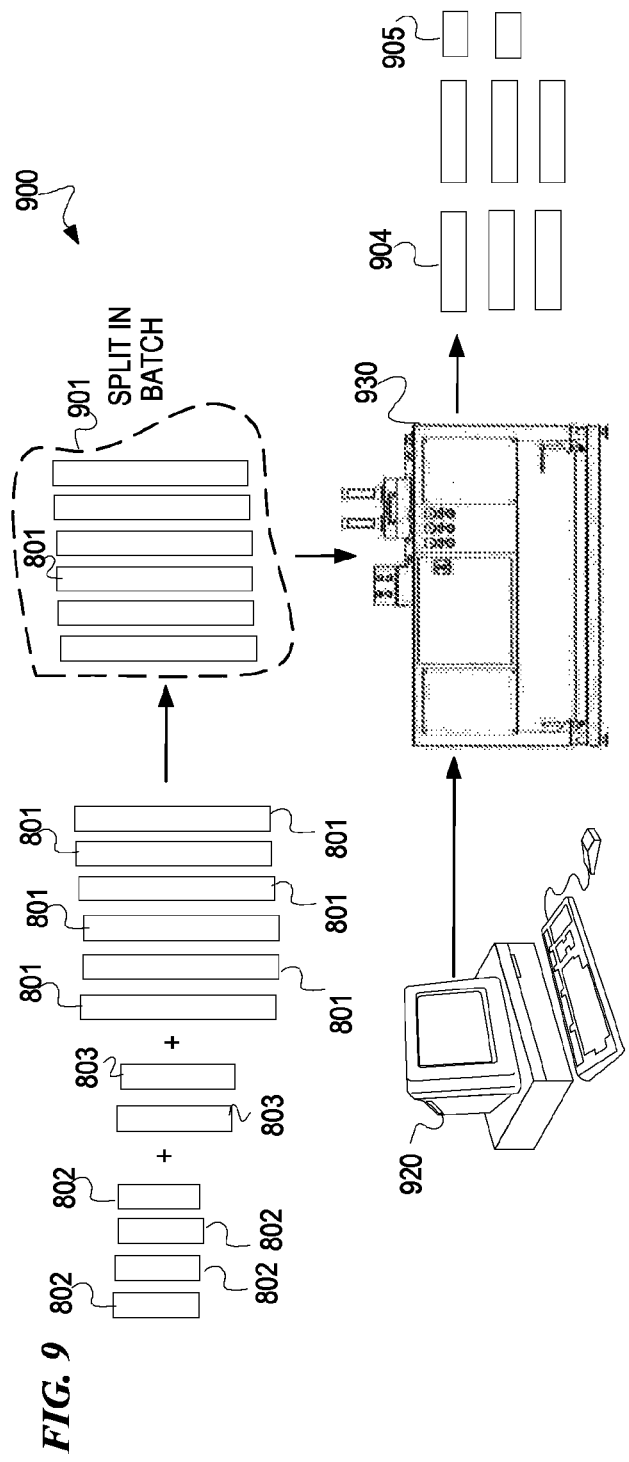
FIG. 9 is a schematic 900 showing various component pieces that make up the optimized batch 812.

FIG. 9 is a schematic 900 showing various component pieces that make up the optimized batch 812 (e.g., sorted-by-length pieces having reference numbers 801, 802, and 803). In some embodiments, these component materials are split up through a split in batch operation wherein component materials of similar size (e.g., the set containing component materials 801) are split into a separate split-in-batch set 901. In some embodiments, a computer system 920 is used to control and implement the above-described algorithm for optimizing an individual batch down to minimum cuts. In some embodiments, this computer 920 controls a saw 930 wherein the saw 930 is provided the split in batch set 901, the saw 930 then cutting the component materials 801 into separate-length pieces 904 (the longer pieces) and 905 (the shorter pieces). In some embodiments, the computer 920 actually implements the algorithm for optimizing an individual batch down to minimum cuts, whereas in other embodiments this algorithm is implemented by a separate computer.

Figure 10:
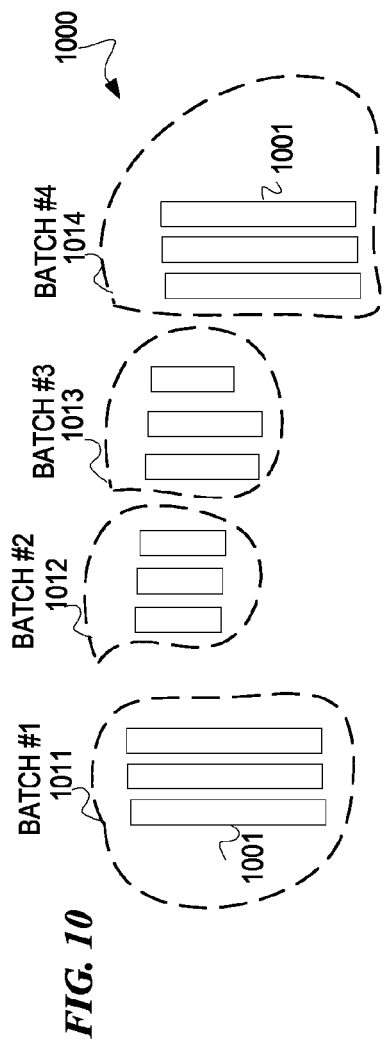
FIG. 10 is a schematic 1000 of an implementation of an algorithm for optimizing across multiple batches.

FIG. 10 is a schematic 1000 of an implementation of an algorithm for optimizing across multiple batches. In this example, optimization occurs across a first batch 1011 (which is initially considered to be the "primary" batch), a second batch 1012 (which is initially considered to be the "look-ahead or secondary" batch), and further future third batch 1013, and fourth batch 1014. Common to the first batch 1011 and fourth batch 1014 are various materials components 1001 each of an equal specified length. Once all parts of the primary batch 1011 have been cut, batch 1012 becomes the primary batch, and when this happens, one or more additional look-ahead batches may be added to those considered in the present optimization process. At the start of a workday or work shift, the last batch of the prior day or shift is set as the initial primary batch to start this workday or work shift. In some embodiments, the primary batch will, by definition, have no pieces from a prior batch, but may consider pieces from forward (future) batches in its optimization algorithm.

Figure 11:
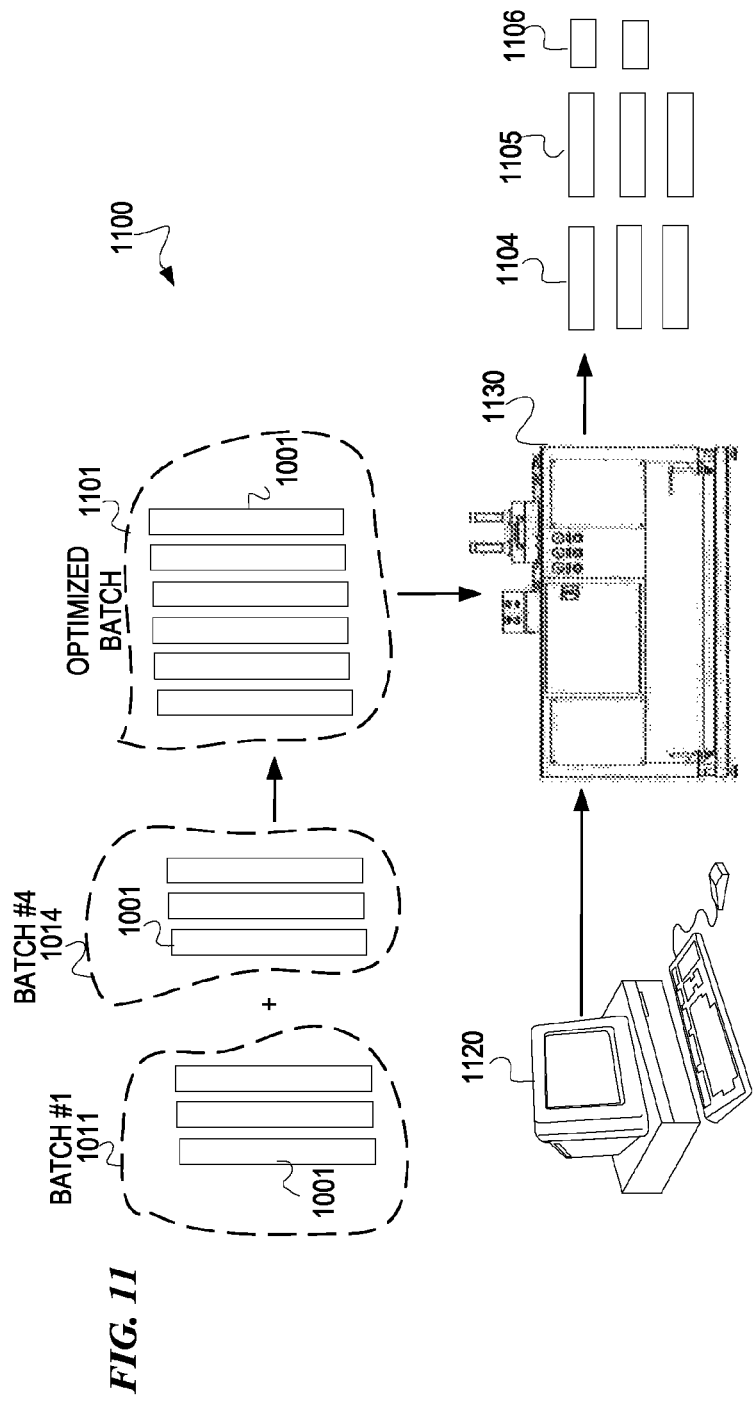
FIG. 11 is a schematic 1100 of an implementation of combining of batch #1 1011 and batch #4 1014 and the materials component 1001 contained therein.

FIG. 11 is a schematic 1100 of an implementation of combining of first batch 1011 and fourth batch 1014 and the materials component 1001 contained therein. These two batches (i.e., batch 1011 and batch 1014) are combined into a to-be-optimized combined batch 1101 containing the material components 1001 of batch 1011 and batch 1014. In some embodiments, this optimized batch 1101 is provided to a saw 1130 controlled by a computer 1120. The saw 1130, in some embodiments, then cuts the materials components 1001 into pieces 1104 (of a first length and/or angle of end-cut), 1105 (of a second length and/or angle of end-cut), and 1106 (of a third length and/or angle of end-cut). In some embodiments, the saw-control computer 1120 actually implements the algorithm for optimizing an individual batch down to minimum cuts, whereas in other embodiments this algorithm is implemented by a separate computer.

Figure 12:
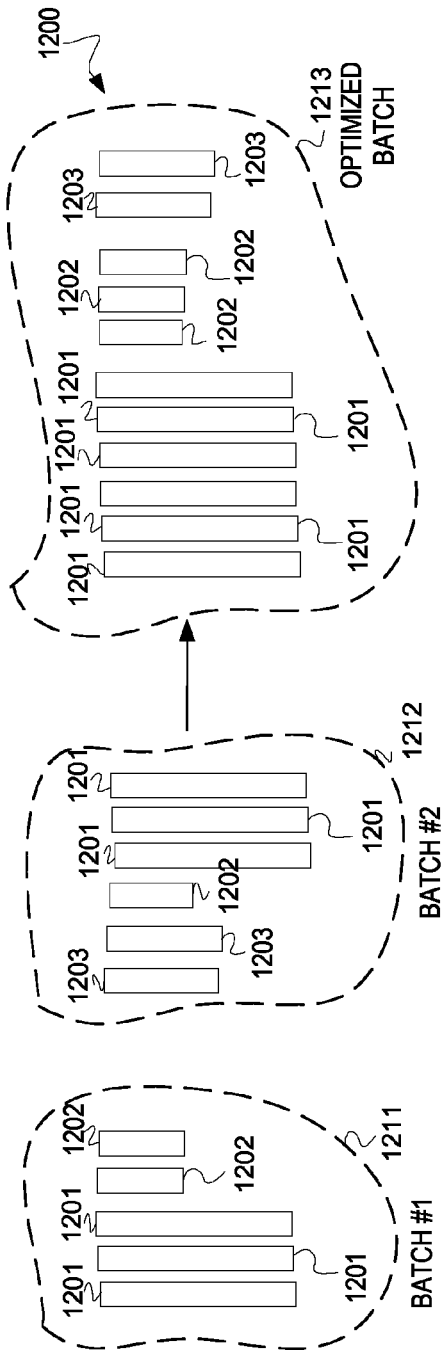
FIG. 12 is a schematic 1200 of an implementation of an algorithm for optimizing an individual batch on a rolling basis.

FIG. 12 is a schematic 1200 of an implementation of an algorithm for optimizing an individual batch on a rolling basis. Shown in FIG. 12 are a first batch 1211 and a second batch 1212. Batch 1211 contains materials components 1201 and 1202, while batch 1212 contains materials components 1203 in addition to material components 1202 and 1201. In some embodiments, an optimized batch 1213 is defined wherein the materials components 1201 from batch 1211 and batch 1212 are combined and/or sorted into batch 1213, as are materials components 1202 from batch 1211 and batch 1212. The materials components 1201 are then used to create a split in batch 1301 (see FIG. 13) that contains just the materials components 1201. Similarly, though not pictured, materials components 1202 are also used to create another split in batch. The materials components 1203 in batch 1212 are not used to create a split in batch 1301 (see FIG. 13 description below), but rather are used for subsequent batches on a rolling basis. More to the point, a rolling basis denotes that material components within a batch may be combined with materials components of a similar size in the next subsequent batch. Any remaining materials components that are not combined are combined with the next subsequent batch, and so on.

Figure 13:
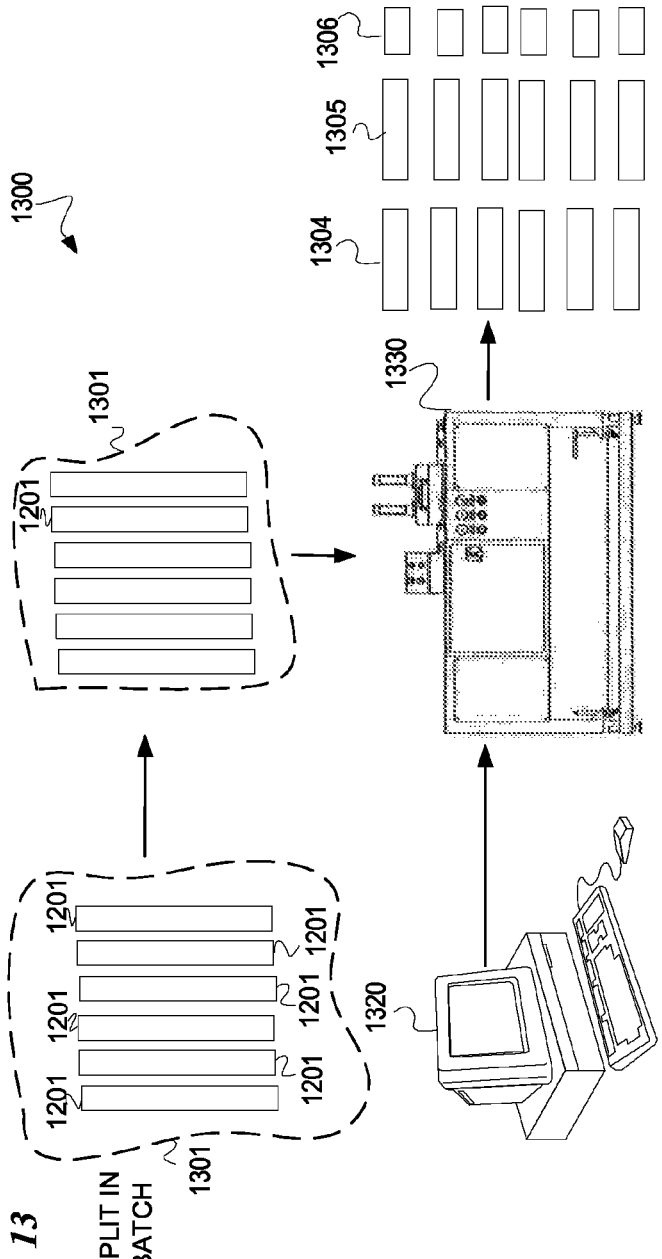
FIG. 13 is a schematic 1300 of an implementation of the processing of a split in batch 1301.

FIG. 13 is a schematic 1300 of an implementation of the processing of a split in batch 1301. In some embodiments, a split in batch 1301 composed of, for example, materials components 1201 are provided to a saw 1330 controlled by a computer 1320. In some embodiments, the saw 1330 cuts the materials components 1201 into pieces 1304, 1305 and 1306. In some embodiments, the computer 1320 actually implements the algorithm for optimizing an individual batch on a rolling basis, whereas in other embodiments this algorithm is implemented by a separate computer.

In some embodiments, the present invention provides a computerized method that includes eliciting and receiving a specification of a number of batches that may be included in a look-ahead process, a specification of a maximum number of parts per batch, a specification of a maximum number of splits, and a specification of at least one type of optimization including type labor optimization, raw material optimization, scrap-or-yield optimization, number-of-saw-cycles optimization, and space optimization; inputting a plurality of orders for cut-part items; matching cut parts up to the specified maximum number of items per batch setting; optimizing the items across a schedule for quantities equal to the specified maximum number of items setting; evaluating loads according to the specified maximum number of splits and for loads that fail, and deleting them and splitting the quantities; changing the specified maximum number of items setting to a next lowest setting; determining whether the specified maximum number of items setting is less than one and if not, branching back to the matching function and if so continuing; performing a maxgroup function; and sorting item specifications according to batch such that the optimization is complete. As used herein, a "type of optimization" is another way of describing a constraint (of one or more parameters) that the optimization process will try to best satisfy.

Some embodiments of the method further include cutting linear (one-dimensional) stock into cut items according to the batch-sorted item specifications. Some embodiments further include assembling at least part of a window from the cut items. Some embodiments further include assembling at least part of a door from the cut items.

Some embodiments of the method further include cutting sheet (two-dimensional) stock into cut items according to the batch-sorted item specifications. Some embodiments further include assembling at least part of a window from the cut items. Some embodiments further include assembling at least part of a door from the cut items.

In some embodiments, the present invention provides a computerized method that includes setting the maximum number of parts (max parts) to the max_parts variable; matching the items up to the current max parts setting according to MaxMatch; optimizing the items across the schedule for quantities equal to the current max parts setting; evaluating the loads according to the maxsplit variables and for loads that fail, deleting them and splitting the quantities; changing the max parts setting to the next lowest setting; determining whether maxparts setting is less than one and if not, branching back to the matching function and if so continuing; performing the maxgroup function; and sorting items according to batch such that the optimization is complete.

In some embodiments, the present invention provides a computerized apparatus that includes means for setting the maximum number of parts (max parts) to the max_parts variable; means for matching the items up to the current max parts setting according to MaxMatch; means for optimizing the items across the schedule for quantities equal to the current max parts setting; means for evaluating the loads according to the maxsplit variables and for loads that fail, deleting them and splitting the quantities; means for changing the max parts setting to the next lowest setting; means for determining whether maxparts setting is less than one and if not, branching back to the matching function and if so continuing; means for performing the maxgroup function; and means for sorting items according to batch.

In some embodiments, the present invention provides a computerized apparatus that includes means for eliciting and receiving a specification of a number of batches that may be included in a look-ahead process, a specification of a maximum number of parts per batch, a specification of a maximum number of splits, and a specification of at least one type of optimization including type labor optimization, raw material optimization, scrap-or-yield optimization, number-of-saw-cycles optimization, and space optimization constraints; means for inputting a plurality of orders for cut-part items; means for matching cut parts up to the specified maximum number of items per batch setting; means for optimizing the items across a schedule for quantities equal to the specified maximum number of items setting; means for evaluating loads according to the specified maximum number of splits and for loads that fail, and deleting them and splitting the quantities; means for changing the specified maximum number of items setting to a next lowest setting; means for determining whether the specified maximum number of items setting is less than one and if not, branching back to the matching function and if so continuing; means for performing a maxgroup function; and means for sorting item specifications according to batch such that the optimization is complete.

Some embodiments of the apparatus further include means for cutting linear (one-dimensional) stock into cut items according to the batch-sorted item specifications. Some embodiments further include means for assembling at least part of a window from the cut items. Some embodiments further include means for assembling at least part of a door from the cut items.

Some embodiments of the apparatus further include means for cutting sheet (two-dimensional) stock into cut items according to the batch-sorted item specifications. Some embodiments further include means for assembling at least part of a window from the cut items. Some embodiments further include means for assembling at least part of a door from the cut items.

In some embodiments, the present invention provides a computerized apparatus that includes a receiver unit that receives the maximum number of parts (max parts) to set the max_parts variable; matcher unit that matches the items up to the current max parts setting according to MaxMatch; an optimizer unit that optimizes the items across the schedule for quantities equal to the current max parts setting; an evaluator unit that evaluates the loads according to the maxsplit variables and for loads that fail, deletes them and splits the quantities; a changer unit that changes the max parts setting to the next lowest setting; a determiner unit that determines whether maxparts setting is less than one and if not, branches back to the matching function and if so continuing; a maxgroup unit that performs a maxgroup function; and a sorter that sorts items according to batch.

Some embodiments further include a cutter configured to cut linear (one-dimensional) stock into cut items according to the batch-sorted item specifications. Some embodiments further include an assembly mechanism that assembles at least part of a window from the cut items. Some embodiments further include an assembly mechanism that assembles at least part of a door from the cut items.

Some embodiments further include a cutting machine configured to cut sheet (two-dimensional) stock into cut items according to the batch-sorted item specifications. Some embodiments further include an assembly mechanism that assembles at least part of a window from the cut items. Some embodiments further include an assembly mechanism that assembles at least part of a door from the cut items.

Figure 14:
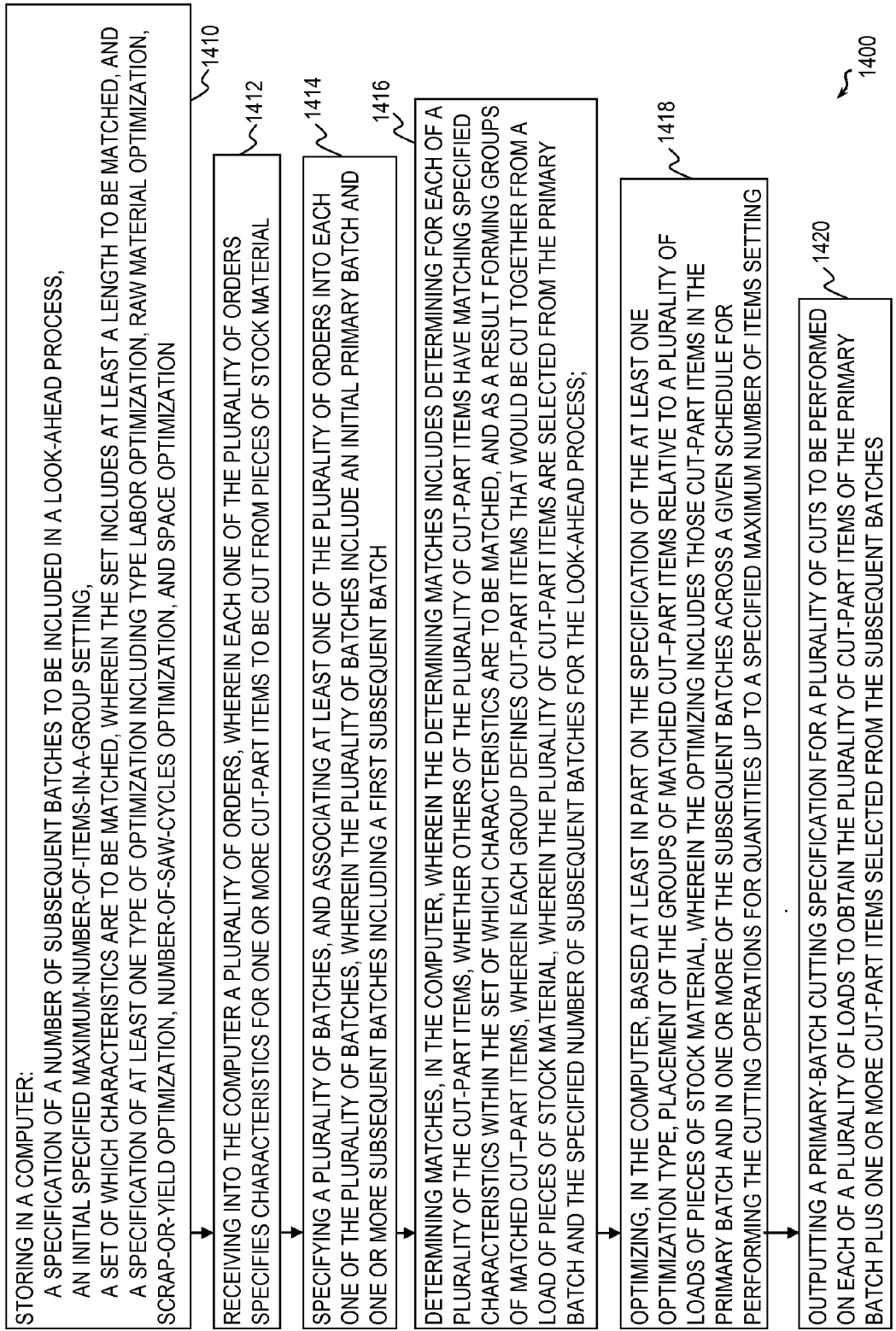
FIG. 14 is a schematic 1400 of an implementation of the invention.

FIG. 14 is a schematic 1400 of an implementation of the invention. In some embodiments, the present invention provides a computerized method 1400 that includes storing 1410 in a computer: a specification of a number of subsequent batches to be included in a look-ahead process, an initial specified maximum-number-of-items-in-a-group setting, a set of which characteristics are to be matched, wherein the set includes at least a length to be matched, and a at least one type of optimization including type labor optimization, raw material optimization, scrap-or-yield optimization, number-of-saw-cycles optimization, and space optimization. This method also includes receiving 1412 into the computer a plurality of orders, wherein each one of the plurality of orders specifies characteristics for one or more cut-part items to be cut from pieces of stock material; specifying 1414 a plurality of batches, and associating at least one of the plurality of orders into each one of the plurality of batches, wherein the plurality of batches include an initial primary batch and one or more subsequent batches including a first subsequent batch; determining matches 1416, in the computer, wherein the determining matches includes determining for each of a plurality of the cut-part items, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the specified number of subsequent batches for the look-ahead process; optimizing 1418, in the computer, based at least in part on the specification of at least one type of optimization including type labor optimization, raw material optimization, scrap-or-yield optimization, number-of-saw-cycles optimization, and space optimization (at least one of labor, raw material, scrap-or-yield, number-of-saw-cycles and space constraints), placement of the groups of matched cut-part items relative to a plurality of loads of pieces of stock material, wherein the optimizing includes those cut-part items in the primary batch and in one or more of the subsequent batches across a given schedule for performing the cutting operations for quantities up to a specified maximum number of items setting; and outputting 1420 a primary-batch cutting specification for a plurality of cuts to be performed on each of a plurality of loads to obtain the plurality of cut-part items of the primary batch plus one or more cut-part items selected from the subsequent batches.

Figure 15:
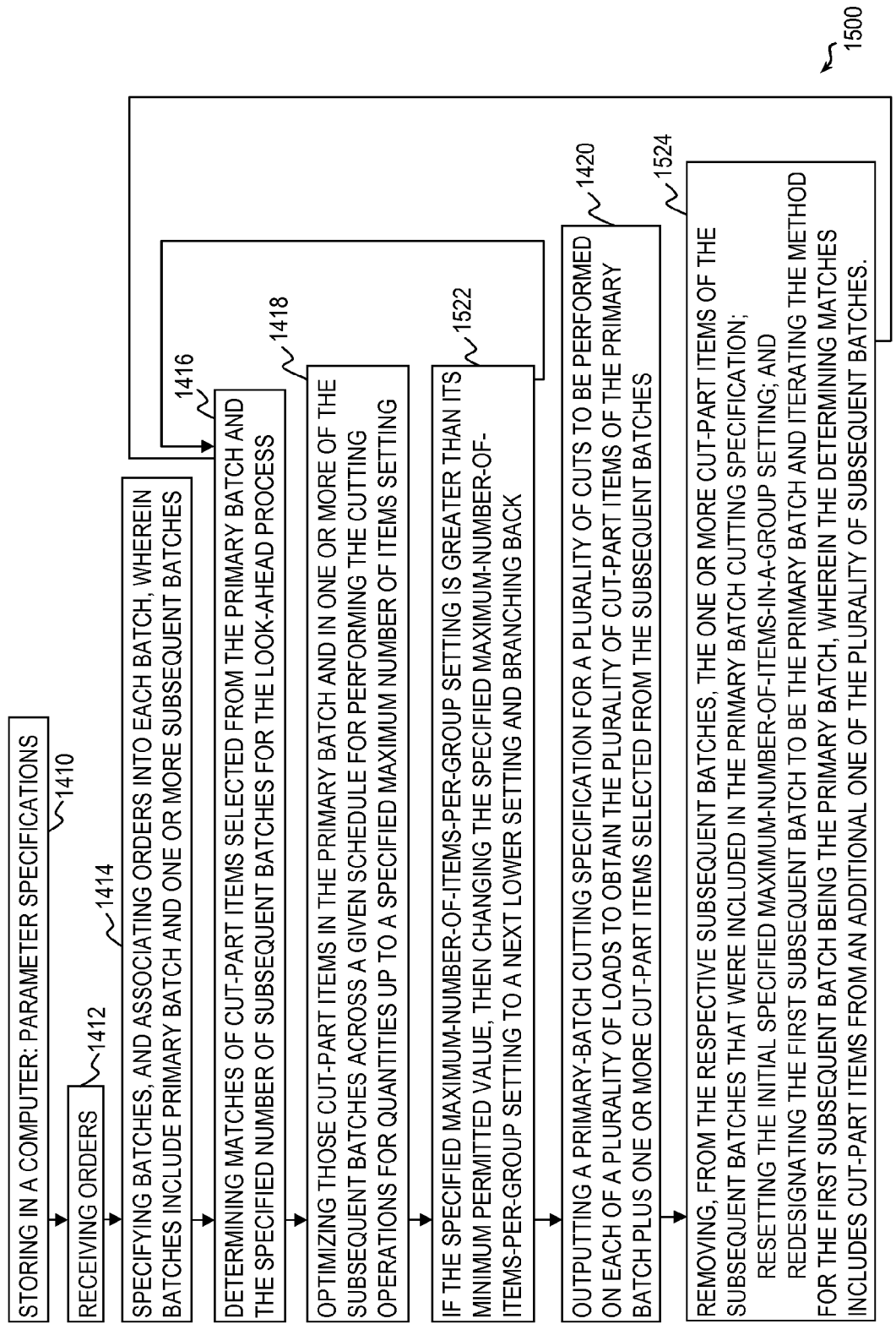
FIG. 15 is a schematic 1500 of another implementation of the invention.

FIG. 15 is a schematic 1500 of another implementation of the invention. In some embodiments, Blocks 1410, 1412, 1414, 1416, 1418, and 1420 are as described above for FIG. 14. In some embodiments of this method, the storing 1410 into the computer further includes storing an initial specified maximum-number-of-items-in-a-group setting, and the method further includes, after the optimizing, performing 1522: if the specified maximum-number-of-items-per-group setting is greater than its minimum permitted value, then changing the specified maximum-number-of-items-per-group setting to a next lower setting and branching back to the determining of matches function.

Some embodiments of this method further include performing 1524: removing, from the respective subsequent batches, the one or more cut-part items of the subsequent batches that were included in the primary batch cutting specification; resetting the initial specified maximum-number-of-items-in-a-group setting; and redesignating the first subsequent batch to be the primary batch and iterating the method for the first subsequent batch being the primary batch, wherein the determining matches includes cut-part items from an additional one of the plurality of subsequent batches.

Some embodiments of this method further include cutting linear ("one-dimensional") stock into cut items according to the primary-batch cutting specification.

Some embodiments of this method further include assembling at least part of a window from the cut items.

Some embodiments of this method further include cutting sheet (two-dimensional) stock into cut items according to the primary-batch cutting specification.

Some embodiments of this method further include assembling at least part of a window from the cut items.

Figure 16:
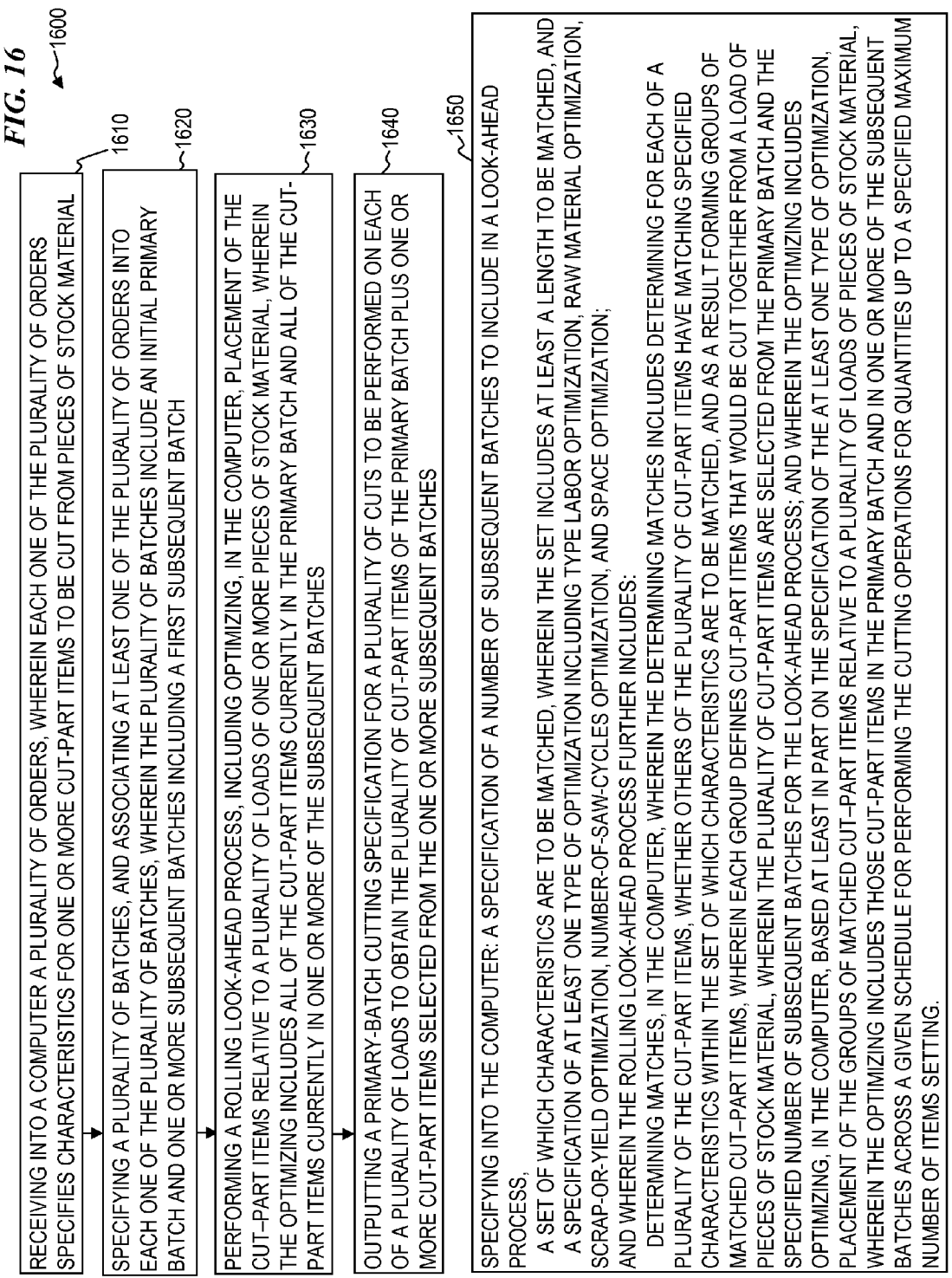
FIG. 16 is a schematic 1600 of yet another implementation of the invention.

FIG. 16 is a schematic 1600 of yet another implementation of the invention. In some embodiments, the present invention provides a method that includes receiving 1610 into a computer a plurality of orders, wherein each one of the plurality of orders specifies characteristics for one or more cut-part items to be cut from pieces of stock material; specifying 1620 a plurality of batches, and associating at least one of the plurality of orders into each one of the plurality of batches, wherein the plurality of batches include an initial primary batch and one or more subsequent batches including a first subsequent batch; performing 1630 a rolling look-ahead process, including optimizing, in the computer, placement of the cut-part items relative to a plurality of loads of one or more pieces of stock material, wherein the optimizing includes those cut-part items in the primary batch and in one or more of the subsequent batches; and outputting 1640 a primary-batch cutting specification for a plurality of cuts to be performed on each of a plurality of loads to obtain the plurality of cut-part items of the primary batch plus one or more cut-part items selected from the one or more subsequent batches.

Some embodiments further include specifying 1650 into the computer a specification of a number of subsequent batches to be included in a look-ahead process, a set of which characteristics are to be matched, wherein the set includes at least a length to be matched, and a specification of at least one type of optimization including type labor optimization, raw material optimization, scrap-or-yield optimization, number-of-saw-cycles optimization, and space optimization; wherein the rolling look-ahead process further includes determining matches, in the computer, wherein the determining matches includes determining for each of a plurality of the cut-part items, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the specified number of subsequent batches for the look-ahead process; and wherein the optimizing includes optimizing, in the computer, based at least in part on the specification of at least one type of optimization including type labor optimization, raw material optimization, scrap-or-yield optimization, number-of-saw-cycles optimization, and space optimization, placement of the groups of matched cut-part items relative to a plurality of loads of pieces of stock material, wherein the optimizing includes those cut-part items in the primary batch and in one or more of the subsequent batches across a given schedule for performing the cutting operations for quantities up to a specified maximum number of items setting.

In some embodiments, the specifying into a computer further includes specifying an initial specified maximum-number-of-items-in-a-group setting, and the method further includes after the optimizing, if the specified maximum-number-of-items-per-group setting is greater than its minimum permitted value, then changing the specified maximum-number-of-items-per-group setting to a next lower setting and branching back to the determining of matches function.

Some embodiments further include removing, from the respective subsequent batches, the one or more cut-part items of the subsequent batches that were included in the primary batch cutting specification; resetting the initial specified maximum-number-of-items-in-a-group setting; and redesignating the first subsequent batch to be the primary batch and iterating the method for the first subsequent batch being the primary batch, wherein the determining matches includes cut-part items from an additional one of the plurality of subsequent batches.

In other embodiments, the present invention provides an apparatus that includes a computer having stored therein a plurality of orders, wherein each one of the plurality of orders specifies characteristics for one or more cut-part items to be cut from pieces of stock material, wherein the computer includes a specified plurality of batches, and an association of at least one of the plurality of orders into each one of the plurality of batches, wherein the plurality of batches include an initial primary batch and one or more subsequent batches including a first subsequent batch; means for performing a rolling look-ahead process, including means for optimizing placement of cut-part items in the primary batch and in one or more of the subsequent batches relative to a plurality of loads of one or more pieces of stock material; and an output device, operatively coupled to the means for performing the rolling look-ahead process, that outputs a primary-batch cutting specification for a plurality of cuts to be performed on each of a plurality of loads to obtain the plurality of cut-part items of the primary batch plus one or more cut-part items selected from the one or more subsequent batches.

In some embodiments of the apparatus, the computer has a stored specification of a number of subsequent batches to be included in a look-ahead process, a specified set of which characteristics are to be matched, wherein the set includes at least a length to be matched; and a stored specification of at least one type of optimization including type labor optimization, raw material optimization, scrap-or-yield optimization, number-of-saw-cycles optimization, and space optimization; and wherein the means for performing the rolling look-ahead process further includes: means for determining matches, in the computer, wherein the determining of matches includes determining for each of a plurality of the cut-part items, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the specified number of subsequent batches for the look-ahead process; and wherein the means for optimizing includes means for optimizing, in the computer, based at least in part on the specification of at least one type of optimization including type labor optimization, raw material optimization, scrap-or-yield optimization, number-of-saw-cycles optimization, and space optimization, placement of the groups of matched cut-part items relative to a plurality of loads of pieces of stock material, wherein the optimization includes those cut-part items in the primary batch and in one or more of the subsequent batches across a given schedule for performing the cutting operations for quantities up to a specified maximum number of items setting.

In some embodiments of the apparatus, the computer includes a specification of an initial specified maximum-number-of-items-in-a-group setting, and the apparatus further includes means, if the specified maximum-number-of-items-per-group setting is greater than its minimum permitted value, for changing the specified maximum-number-ofitems-per-group setting to a next lower setting and branching back to the determining of matches function.

Some embodiments of the apparatus further include means for removing, from the respective subsequent batches, the one or more cut-part items of the subsequent batches that were included in the primary batch cutting specification; means for resetting the initial specified maximum-number-of-items-in-a-group setting; and means for re-designating the first subsequent batch to be the primary batch and iterating for the first subsequent batch being the primary batch, wherein the means for determining matches includes cut-part items from an additional one of the plurality of subsequent batches.

In some embodiments, the present invention provides a computer-readable medium having instructions stored thereon for causing a suitably programmed computer to perform a method that includes receiving into the computer a plurality of orders, wherein each one of the plurality of orders specifies characteristics for one or more cut-part items to be cut from pieces of stock material; specifying a plurality of batches, and associating at least one of the plurality of orders into each one of the plurality of batches, wherein the plurality of batches include an initial primary batch and one or more subsequent batches including a first subsequent batch; performing a rolling look-ahead process, including optimizing placement of the cut-part items relative to a plurality of loads of one or more pieces of stock material, wherein the optimizing includes those cut-part items in the primary batch and in one or more of the subsequent batches; and outputting a primary-batch cutting specification for a plurality of cuts to be performed on each of a plurality of loads to obtain the plurality of cut-part items of the primary batch plus one or more cut-part items selected from the one or more subsequent batches.

In some embodiments, the computer-readable medium further includes instructions stored thereon to cause the method to further include storing in the computer: a specification of a number of subsequent batches to be included in a look-ahead process, a set of which characteristics are to be matched, wherein the set includes at least a length to be matched, and a specification of at least one type of optimization including type labor optimization, raw material optimization, scrap-or-yield optimization, number-of-saw-cycles optimization, and space optimization; and instructions such that the rolling look-ahead process further includes: determining matches, in the computer, wherein the determining matches includes determining for each of a plurality of the cut-part items, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the specified number of subsequent batches for the look-ahead process; and instructions such that the optimizing includes optimizing, in the computer, based at least in part on the specification of at least one type of optimization including type labor optimization, raw material optimization, scrap-or-yield optimization, number-of-saw-cycles optimization, and space optimization, placement of the groups of matched cut-part items relative to a plurality of loads of pieces of stock material, wherein the optimizing includes those cut-part items in the primary batch and in one or more of the subsequent batches across a given schedule for performing the cutting operations for quantities up to a specified maximum number of items setting.

In some embodiments, the computer-readable medium further includes instructions stored thereon to cause the method to further include storing an initial specified maximum-number-of-items-in-a-group setting, and after the optimizing, if the specified maximum-number-of-items-per-group setting is greater than its minimum permitted value, then changing the specified maximum-number-of-items-per-group setting to a next lower setting and branching back to the determining of matches function.

In some embodiments, the computer-readable medium further includes instructions stored thereon to cause the method to further include removing, from the respective subsequent batches, the one or more cut-part items of the subsequent batches that were included in the primary batch cutting specification; resetting the initial specified maximum-number-of-items-in-a-group setting; and re-designating the first subsequent batch to be the primary batch and iterating the method for the first subsequent batch being the primary batch, wherein the determining matches includes cut-part items from an additional one of the plurality of subsequent batches.

In some embodiments, the computer-readable medium further includes instructions stored thereon to cause the method to further include controlling a cutting machine to cut stock materials according to the primary-batch cutting specification.

In some embodiments, the present invention provides a computerized method that includes specifying into a computer: {a specification of a number of batches to be included in a look-ahead process, an initial specified maximum-number-of-items-in-a-group setting, a set ("set") of which characteristics are to be matched, wherein the set includes at least a length to be matched, a specification of a maximum number of cut-part items per batch ("max_parts"), a specification of a maximum number of splits, and a specification of at least one type of optimization including type labor optimization, raw material optimization, scrap-or-yield optimization, number-of-saw-cycles optimization, and space optimization; receiving into a computer a plurality of orders ("orders"), wherein each one of the plurality of orders specifies characteristics for one or more cut-part items ("parts") to be cut from pieces of stock material ("one or more SKUs")}; specifying a plurality of batches ("batches"), and associating at least one of the plurality of orders into each one of the plurality of batches, wherein the plurality of batches include an initial primary batch and one or more subsequent batches including a first subsequent batch; determining, in the computer, for each of a plurality of the cut-part items, whether others of the plurality of cut-part items have matching specified characteristics within the set of which characteristics are to be matched, and as a result forming groups of matched cut-part items, wherein each group defines cut-part items that would be cut together ("in one cycle") from a load of pieces of stock material; optimizing, in the computer, based at least in part on a specification of at least one type of optimization including type labor optimization, raw material optimization, scrap-or-yield optimization, number-of-saw-cycles optimization, and space optimization, placement of the groups of matched cut-part items relative to a plurality of loads of pieces of stock material, wherein the optimizing includes those cut-part items in the primary batch and in one or more of the subsequent batches across a given schedule for performing the cutting operations for quantities up to a specified maximum number of items setting; evaluating a plurality of the loads according to user-set parameters for splitting loads, and for loads that fail this evaluation, deleting the failed loads and splitting the groups placed in those loads into smaller quantities for a further optimization, and removing the parts in the loads that meet the evaluation from those that are still to be matched and optimized; if the specified maximum-number-of-items-pergroup setting is greater than its minimum permitted value, then changing the specified maximum-number-of-items-per-group setting to a next lower setting and branching back to the matching function; outputting a primary-batch cutting specification for a plurality of cuts to be performed on each of a plurality of loads to obtain the plurality of cut-part items of the primary batch plus one or more cut-part items of the subsequent batches; removing, from the respective subsequent batches, the one or more cut-part items of the subsequent batches that were included in the primary batch cutting specification; performing a maxgroup function; and sorting item specifications according to batch such that the optimization is complete.

In some embodiments, the present invention provides a computerized method that includes specifying into a computer: {a specification of a number of batches that may be included in a look-ahead process, a specified maximum number of items setting, a specification of a maximum number of cut-part items per batch ("max_parts"), a specification of a maximum number of splits, and a specification of at least one type of optimization including type labor optimization, raw material optimization, scrap-or-yield optimization, number-of-saw-cycles optimization, and space optimization}; receiving into the computer a plurality of orders, wherein each one of the plurality of orders specifies one or more cut-part items; matching, in the computer, the specifications for cut-part items to determine groups/sets of identical cut-part items, relative to available raw material in a plurality of batches of cutting operations that cut the raw material into cut-part items, up to a specified maximum number of cut-part items per batch, wherein the plurality of batches include a primary batch that will be cut soonest and a plurality of later batches; optimizing, in the computer, based on a specification of at least one type of optimization including type labor optimization, raw material optimization, scrap-or-yield optimization, number-of-saw-cycles optimization, and space optimization, placement of the specifications for cut-part items into the batches across a given schedule for performing the cutting operations for quantities up to a specified maximum number of items setting; evaluating loads according to the specified maximum number of splits and for loads that fail, and deleting them and splitting the quantities; changing the specified maximum number of items setting to a next lowest setting; determining whether the specified maximum number of items setting is less than one and if not, branching back to the matching function and if so continuing; performing a maxgroup function; and sorting item specifications according to batch such that the optimization is complete.

In some embodiments, when looking for identical parts in other batches, and if and how to match them up, the following settings indicate how the matching will be performed: (1) Only match within a batch, (2) Match across the entire schedule, (3) Match across up to a specific number of batches (indicated in MaxMatchBatch), or (4) Do not Match.

In some embodiments, the present invention provides a computerized method that includes specifying into a computer: a specification of a number of batches that may be included in a look-ahead process, a specification of a maximum number of parts per batch, a specification of a maximum number of splits, and a specification of at least one type of optimization including type labor optimization, raw material optimization, scrap-or-yield optimization, number-of-saw-cycles optimization, and space optimization; receiving into the computer a plurality of orders for cut-part items; matching cut-part items, in the computer, up to the specified maximum number of raw materials that can be cut in a cycle (items per batch setting); optimizing the placement of items into batches across a schedule for quantities up to the specified maximum number of items setting; evaluating loads according to parameters that the user set for splitting and for loads that fail that evaluation, deleting them and splitting those loads into smaller quantities for a further optimization, and removing the parts in the loads that meet the evaluation from those that are yet to be matched and optimized; changing the specified maximum number of items setting to a next lowest setting; determining whether the specified maximum number of raw-material items per cycle setting is less than the minimum-parts setting and if not, branching back to the matching function and if so continuing; performing a maxgroup function according to a specification of: (a) Group up to the max_cuts setting, (b) Group up to a specific setting as indicated by a groupparts setting, or (c) Do not group; and sorting item specifications according to batch such that the optimization is complete.

Some embodiments further include cutting linear ("one-dimensional") stock into cut items according to the batch-sorted item specifications. In some such embodiments, the method further includes assembling at least part of a window from the cut items. In some such embodiments, the method further includes assembling at least part of a door from the cut items.

Some embodiments further include cutting sheet (two-dimensional) stock into cut items according to the batch-sorted item specifications. In some such embodiments, the method further includes assembling at least part of a window from the cut items. In some such embodiments, the method further includes assembling at least part of a door from the cut items.

In some embodiments, the present invention provides a computerized method that includes setting a max_parts variable to a specified a maximum number of parts; matching a plurality of cut-part items up to the max_parts setting; optimizing the items across the schedule for quantities equal to the current max parts setting; evaluating the loads according to the maxsplit variables and for loads that fail, deleting them and splitting the quantities; changing the max parts setting to the next lowest setting; determining whether max_parts setting is less than one and if not, branching back to the matching function and if so continuing; performing the maxgroup function; and sorting items according to batch such that the optimization is complete.

In some embodiments, the present invention provides an apparatus that includes means for setting the maximum number of parts (max parts) to the max_parts variable; means for matching the items up to the current max parts setting according to MaxMatch; means for optimizing the items across the schedule for quantities equal to the current max parts setting; means for evaluating the loads according to the maxsplit variables and for loads that fail, deleting them and splitting the quantities; means for changing the max parts setting to the next lowest setting; means for determining whether maxparts setting is less than one and if not, branching back to the matching function and if so continuing; means for performing the maxgroup function; and means for sorting items according to batch.

In some embodiments, the present invention provides an apparatus that includes means for eliciting and receiving a specification of a number of batches that may be included in a look-ahead process, a specification of a maximum number of parts per batch, a specification of a maximum number of splits, and a specification of at least one type of optimization including type labor optimization, raw material optimization, scrap-or-yield optimization, number-of-saw-cycles optimization, and space optimization; means for inputting a plurality of orders for cut-part items; means for matching cut parts up to the specified maximum number of items per batch setting; means for optimizing the items across a schedule for quantities equal to the specified maximum number of items setting; means for evaluating loads according to the specified maximum number of splits and for loads that fail, and deleting them and splitting the quantities; means for changing the specified maximum number of items setting to a next lowest setting; means for determining whether the specified maximum number of items setting is less than one and if not, branching back to the matching function and if so continuing; means for performing a maxgroup function; and means for sorting item specifications according to batch such that the optimization is complete.

Some embodiments further include means for cutting linear (one-dimensional) stock into cut items according to the batch-sorted item specifications. In some such embodiments, the apparatus further includes means for assembling at least part of a window from the cut items. In some such embodiments, the apparatus further includes means for assembling at least part of a door from the cut items.

Some embodiments further include means for cutting sheet (two-dimensional) stock into cut items according to the batch-sorted item specifications. In some such embodiments, the apparatus further includes means for assembling at least part of a window from the cut items. In some such embodiments, the apparatus further includes means for assembling at least part of a door from the cut items.

In some embodiments, the present invention provides an apparatus that includes a receiver unit that receives the maximum number of parts (max parts) to set the max_parts variable; a matcher unit that matches the items up to the current max parts setting according to MaxMatch; an optimizer unit that optimizes the items across the schedule for quantities equal to the current max parts setting; an evaluator unit that evaluates the loads according to the maxsplit variables and for loads that fail, deletes them and splits the quantities; a changer unit that changes the max parts setting to the next lowest setting; a determiner unit that determines whether maxparts setting is less than one and if not, branches back to the matching function and if so continuing; a maxgroup unit that performs a maxgroup function; and a sorter that sorts items according to batch.

Some embodiments further include a cutter configured to cut linear (one-dimensional) stock into cut items according to the batch-sorted item specifications. Some such embodiments further include an assembly mechanism that assembles at least part of a window from the cut items. Some such embodiments further include an assembly mechanism that assembles at least part of a door from the cut items.

Some embodiments further include a cutter configured to cut sheet (two-dimensional) stock into cut items according to the batch-sorted item specifications. Some such embodiments further include an assembly mechanism that assembles at least part of a window from the cut items. Some such embodiments further include an assembly mechanism that assembles at least part of a door from the cut items.

In some embodiments, the present invention provides an apparatus that includes a computer having stored therein a plurality of orders, wherein each one of the plurality of orders specifies characteristics for one or more cut-part items to be cut from pieces of stock material, wherein the computer includes a specified plurality of batches, and an association of at least one of the plurality of orders into each one of the plurality of batches, wherein the plurality of batches include an initial primary batch and one or more subsequent batches including a first subsequent batch; an optimizer that performs a rolling look-ahead process, including optimized placement of cut-part items in the primary batch and in one or more of the subsequent batches relative to a plurality of loads of one or more pieces of stock material; and an output device, operatively coupled to the optimizer, that outputs a primary-batch cutting specification for a plurality of cuts to be performed on each of a plurality of loads to obtain the plurality of cut-part items of the primary batch plus one or more cut-part items selected from the one or more subsequent batches.

In some embodiments of this apparatus, the computer includes a stored specification of a number of subsequent batches to be included in a look-ahead process, a specified set of which characteristics are to be matched, wherein the set includes at least a length to be matched; and a stored specification of at least one type of optimization including type labor optimization, raw material optimization, scrap-or-yield optimization, number-of-saw-cycles optimization, and space optimization; wherein optimizer further includes a matcher to determine matches, in the computer, wherein the determining of matches includes determining for each of a plurality of the cut-part items, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the specified number of subsequent batches for the look-ahead process; and wherein the optimizer operates based at least in part on the specification of at least one type of optimization, placement of the groups of matched cut-part items relative to a plurality of loads of pieces of stock material, wherein the optimization includes those cut-part items in the primary batch and in one or more of the subsequent batches across a given schedule for performing the cutting operations for quantities up to a specified maximum number of items setting.

In some embodiments of this apparatus, the computer includes a specification of an initial specified maximum-number-of-items-in-a-group setting, and wherein the apparatus further comprises a changer that, if the specified maximum-number-of-items-per-group setting is greater than its minimum permitted value, changes the specified maximum-number-of-items-per-group setting to a next lower setting and branches back to the matcher.

Some embodiments of this apparatus further include a remover that removes, from the respective subsequent batches, the one or more cut-part items of the subsequent batches that were included in the primary batch cutting specification; a resetter that resets the initial specified maximum-number-of-items-in-a-group setting; and a redesignator that redesignates the first subsequent batch to be the primary batch and iterates for the first subsequent batch being the primary batch, wherein the matcher includes cut-part items from an additional one of the plurality of subsequent batches.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computerized method comprising:
   storing in a computer:
      a set of which characteristics are to be matched, wherein the set includes at least a length to be matched, and
      a specification of a first type of optimization and a specification of a second type of optimization;
   receiving into the computer a plurality of orders, wherein each one of the plurality of orders specifies characteristics for one or more cut-part items to be cut from pieces of stock material;
   specifying, into the computer, a plurality of batches, and associating at least one of the plurality of orders into each one of the plurality of batches, wherein the plurality of batches include an initial primary batch and one or more subsequent batches including a first subsequent batch;
   determining matches, in the computer, wherein the determining matches includes determining for each of a plurality of cut-part items from across the plurality of orders, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the one or more subsequent batches;
   optimizing, in the computer, placement of the groups of matched cut-part items relative to a plurality of loads of the pieces of stock material, wherein the optimizing includes placing those groups of matched cut-part items in the primary batch and in the one or more subsequent batches, wherein the optimizing further includes:
      a first optimizing based on the specified first type of optimization, in the computer, placement of the groups of matched cut-part items relative to a plurality of loads of the pieces of stock material in the primary batch and in the one or more subsequent batches;
      a second optimizing based on the specified second type of optimization, in the computer, placement of the groups of matched cut-part items relative to a plurality of loads of the pieces of stock material in the primary batch and in the one or more subsequent batches; and
      comparing costs resulting from the first optimizing based on the specified first type of optimization and the second optimizing based on the specified second type of optimization; and
   outputting a primary-batch cutting specification for a plurality of cuts to be performed on each of a plurality of loads to obtain the groups of matched cut-part items.

2. The method of claim 1, wherein the storing into the computer further includes storing an initial specified maximum-number-of-items-in-a-group setting, and wherein the method further comprises:
   after the optimizing, if the specified maximum-number-of-items-per-group setting is greater than its minimum permitted value, then changing the specified maximum-number-of-items-per-group setting to a next lower setting and branching back to the determining of matches function.

3. The computerized method of claim 1, wherein the first type of optimization includes minimizing an amount of waste materials produced as a byproduct of producing the one or more cut-part items and the second type of optimization includes minimizing labor costs.

4. The computerized method of claim 1,
   wherein the first type of optimization includes minimizing an amount of waste materials produced as a byproduct of producing the one or more cut-part items and the second type of optimization includes minimizing labor costs; and
   wherein the minimizing of labor costs includes reducing a number of cuts that an operator of a cutting device must make to produce the one or more cut-part items.

5. The computerized method of claim 1, wherein each group defines cut-part items that would be cut together from a load of pieces of stock material.

6. An apparatus comprising:
   a computer having stored therein a plurality of orders, wherein each one of the plurality of orders specifies characteristics for one or more cut-part items to be cut from pieces of stock material, wherein the computer includes a specified plurality of batches, a specification of a plurality of types of optimization including a first type of optimization and a second type of optimization, and an association of at least one of the plurality of orders into each one of the plurality of batches, wherein the plurality of batches include an initial primary batch and one or more subsequent batches including a first subsequent batch;
   an optimizer that performs a rolling look-ahead process, including optimized placement of cut-part items in the primary batch and in the one or more subsequent batches relative to a plurality of loads of one or more pieces of stock material according to the first type of optimization and according to the second type of optimization, and wherein the optimizer compares costs resulting from optimization according to the first type of optimization to costs resulting from optimization according to the second type of optimization; and
   an output device, operatively coupled to the optimizer, that outputs, based on the compared costs, a primary-batch cutting specification for a plurality of cuts to be performed on each of a plurality of loads to obtain the groups of matched cut-part items.

7. The apparatus of claim 6, wherein the computer includes a specified set of which characteristics are to be matched, wherein the set includes at least a length to be matched;
   wherein the optimizer further includes
      a matcher that makes a determination of matches, in the computer, wherein the determination of matches includes determination for each of a plurality of cut-part items from across the plurality of orders, whether others of the plurality of cut-part items have matching specified characteristics within the set of which characteristics are to be matched, and
      a grouper that forms groups of matched cut-part items, wherein each group defines cut-part items that would be cut together from a load of pieces of stock material, wherein the plurality of cut-part items are selected from the primary batch and the one or more subsequent batches for the look-ahead process.

8. The apparatus of claim 6, wherein the first type of optimization includes minimization of an amount of waste materials produced as a byproduct of cut-part-item production and the second type of optimization includes minimization of labor costs.

9. The apparatus of claim 6,
wherein the first type of optimization includes minimization of an amount of waste materials produced as a byproduct of cut-part-item production and the second type of optimization includes minimization of labor costs; and
wherein the minimization of labor costs includes reduction of a number of cuts that an operator of a cutting device must make to produce the one or more cut-part items.

10. The apparatus of claim 6, further comprising a cutter configured to cut linear stock into cut items according to the primary-batch cutting specification.

11. The apparatus of claim 6, further comprising:
a cutter configured to cut linear stock into cut items according to the primary-batch cutting specification; and
an assembly mechanism that assembles at least part of a window from the cut items.

12. The apparatus of claim 6, further comprising:
a cutter configured to cut linear stock into cut items according to the primary-batch cutting specification; and
an assembly mechanism that assembles at least part of a door from the cut items.

13. A non-transitory computer-readable medium having instructions stored thereon for causing a suitably programmed computer to perform a method comprising:
receiving into the computer a plurality of orders, wherein each one of the plurality of orders specifies characteristics for one or more cut-part items to be cut from pieces of stock material;
specifying, into the computer, a plurality of types of optimization including a first type of optimization and a second type of optimization;
specifying, into the computer, a plurality of batches, and associating at least one of the plurality of orders into each one of the plurality of batches, wherein the plurality of batches include an initial primary batch and one or more subsequent batches including a first subsequent batch;
performing, in the computer, a rolling look-ahead process, including
optimizing placement of the cut-part items relative to a plurality of loads of the pieces of stock material according to the first type of optimization and according to the second type of optimization, wherein the optimizing includes placing the cut-part items in the primary batch and in the one or more subsequent batches, and wherein the optimizing includes comparing costs resulting from the optimizing according to the first type of optimization to costs resulting from the optimizing according to the second type of optimization; and
based on the compared costs, outputting a primary-batch cutting specification for a plurality of cuts to be performed on each of a plurality of loads to obtain the cut-part items.

14. The computer-readable medium of claim 13, further comprising instructions stored thereon to cause the method to further comprise:
storing in the computer:
a set of which characteristics are to be matched, wherein the set includes at least a length to be matched;
and wherein the rolling look-ahead process further includes:
determining matches, in the computer, wherein the determining matches includes determining for each of a plurality of cut-part items from across the plurality of orders, whether others of the plurality of cut-part items have matching specified characteristics within the set of which characteristics are to be matched, and as a result forming groups of matched cut-part items, wherein each group defines cut-part items that would be cut together from a load of pieces of stock material, wherein the plurality of cut-part items are selected from the primary batch and the one or more subsequent batches for the look-ahead process.

15. The computer-readable medium of claim 13, further comprising instructions such that the first type of optimization includes minimizing an amount of waste materials produced as a byproduct of producing the one or more cut-part items and the second type of optimization includes minimizing labor costs.

16. The computer-readable medium of claim 13, further comprising instructions such that:
the first type of optimization includes minimizing an amount of waste materials produced as a byproduct of producing the one or more cut-part items and the second type of optimization includes minimizing labor costs; and
the minimizing of labor costs includes reducing a number of cuts that an operator of a cutting device must make to produce the one or more cut-part items.

17. The computer-readable medium of claim 13, further comprising instructions such that the method further includes cutting linear stock into cut items according to the primary-batch cutting specification.

18. The computer-readable medium of claim 13, further comprising instructions such that the method further includes:
cutting linear stock into cut items according to the primary-batch cutting specification; and
assembling at least part of a window from the cut items.

19. The computer-readable medium of claim 13, further comprising instructions such that the method further includes:
cutting linear stock into cut items according to the primary-batch cutting specification; and
assembling at least part of a door from the cut items.

* * * * *